United States Patent
Kondo

(10) Patent No.: US 12,445,644 B2
(45) Date of Patent: Oct. 14, 2025

(54) IMAGE PROCESSING DEVICE AND IMAGE PROCESSING METHOD

(71) Applicant: Sony Group Corporation, Tokyo (JP)

(72) Inventor: Kenji Kondo, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 448 days.

(21) Appl. No.: 17/616,193

(22) PCT Filed: May 28, 2020

(86) PCT No.: PCT/JP2020/021034
§ 371 (c)(1),
(2) Date: Dec. 3, 2021

(87) PCT Pub. No.: WO2020/250693
PCT Pub. Date: Dec. 17, 2020

(65) Prior Publication Data
US 2022/0321910 A1    Oct. 6, 2022

Related U.S. Application Data

(60) Provisional application No. 62/859,838, filed on Jun. 11, 2019.

(51) Int. Cl.
*H04N 7/12* (2006.01)
*H04N 19/105* (2014.01)
(Continued)

(52) U.S. Cl.
CPC ......... *H04N 19/593* (2014.11); *H04N 19/105* (2014.11); *H04N 19/132* (2014.11); *H04N 19/176* (2014.11)

(58) Field of Classification Search
CPC .. H04N 19/593; H04N 19/105; H04N 19/132; H04N 19/176; H04N 19/117;
(Continued)

(56) References Cited

U.S. PATENT DOCUMENTS 5,696,848 A * 12/1997 Patti ..................... H04N 7/0125
348/E7.016
6,665,344 B1 * 12/2003 Fimoff .................. H04N 19/59
375/E7.184
(Continued)

FOREIGN PATENT DOCUMENTS

TW       201740728 A     11/2017
WO       2020/127811 A2   6/2020
WO       WO-2020239018 A1 12/2020

OTHER PUBLICATIONS

C-H Yau (ITRI) et al: "Non-CE3: MIP simplification", 15. JVET Meeting; Jul. 3, 2019-Jul. 12, 2019; Gothenburg; (The Joint Video Exploration Team of ISO/IEC JTC1/SC29/WG11 and ITU-T SG.16), No. JVET-O0345 ; m48461 Jul. 3, 2019 (Jul. 3, 2019), XP030219305.
Janle Chen et al: "Algorithm description for Versatile Video Coding and Test Model 5 (VTM 5)". 14. JVET Meeting; Mar. 19, 2019-Mar. 27, 2019; Geneva; (The Joint Video Exploration Team of ISO/IEC JTC1/SC29/WG11 and ITU-T SG.16), No. JVET-N1002-v1; JVET-N1002 May 21, 2019 (May 21, 2019), pp. 1-70, XP030205194.
(Continued)

*Primary Examiner* — Gims S Philippe
(74) *Attorney, Agent, or Firm* — XSENSUS LLP

(57) ABSTRACT

The present technology relates to an image processing device and an image processing method capable of improving prediction accuracy.
A predicted image of a current prediction block is generated by performing interpolation processing using an original pixel of a reference image as a top adjacent pixel adjacent to a top of the predicted image of the current prediction block to be encoded/decoded when performing an intra prediction using a matrix operation. Then, the current prediction block is encoded/decoded using the predicted image. The present technology can be applied, for example, to a case of performing the encoding and decoding an image.

10 Claims, 13 Drawing Sheets

(51) Int. Cl.
*H04N 19/132* (2014.01)
*H04N 19/176* (2014.01)
*H04N 19/593* (2014.01)

(58) Field of Classification Search
CPC ...... H04N 19/159; H04N 19/80; H04N 19/11; H04N 19/05
See application file for complete search history.

(56) References Cited

U.S. PATENT DOCUMENTS

| | | | | |
|---|---|---|---|---|
| 2013/0141595 | A1* | 6/2013 | Cho | H04N 25/683 348/E9.037 |
| 2015/0271527 | A1* | 9/2015 | Sugimoto | H04N 19/80 375/240.12 |
| 2018/0007367 | A1* | 1/2018 | Zeng | H04N 19/182 |
| 2020/0322623 | A1* | 10/2020 | Chiang | H04N 19/159 |
| 2022/0167004 | A1* | 5/2022 | Chen | H04N 19/513 |
| 2022/0182616 | A1* | 6/2022 | Li | H04N 19/105 |

OTHER PUBLICATIONS

Laroche (Canon) G et al: "On Mode Dependent Intra Smoothing for Range Extension", 14. JCT-VC Meeting; Jul. 25, 2013-Aug. 2, 2013; Vienna; (Joint Collaborative Team on Video Coding of 1S0/IEC JTC1/SC29/WG11 and ITU-T SG.16), No. JCTVC-N0143 Jul. 25, 2013 (Jul. 25, 2013), XP030237893.

International Search Report and Written Opinion mailed on Aug. 11, 2020, received for PCT Application PCT/JP2020/021034, Filed on May 28, 2020, 9 pages including English Translation.

Pfaff et al., "CE3: Affine Linear Weighted Intra Prediction (CE3-4.1, CE3-4.2)", Joint Video Experts Team (JVET) of ITU-T SG 16 WP 3 and ISO/IEC JTC 1/SC 29/WG 11, JVET-N0217, Mar. 19-27, 2019, 18 pages.

Pfaff et al., "CE3: Affine Linear Weighted Intra Prediction (test 1.2.1, test 1.2.2)", Joint Video Experts Team (JVET) of ITU-T SG 16 WP 3 and ISO/IEC JTC 1/SC 29/WG 11, JVET-M0043, Jan. 9-18, 2019, 12 pages.

* cited by examiner

FIG. 12

LEFT ADJACENT PIXEL

| MiP mode k | SIZE IDENTIFIER (MipSizeId) | | |
|---|---|---|---|
| | 0 | 1 | 2 |
| 0 | Original | Original | Averaged |
| 1 | Original | Averaged | Averaged |
| 2 | Original | Original | Averaged |
| 3 | Original | Averaged | Averaged |
| 4 | Original | Original | Original |
| 5 | Original | Original | Original |
| 6 | Original | Original | Averaged |
| 7 | Original | Averaged | Original |
| 8 | Original | Averaged | Averaged |
| 9 | Original | Original | Original |
| 10 | Original | Averaged | Averaged |
| 11 | Original | Original | |
| 12 | Original | Averaged | |
| 13 | Original | Original | |
| 14 | Averaged | Averaged | |
| 15 | Original | Original | |
| 16 | Original | Averaged | |
| 17 | Original | Averaged | |
| 18 | Original | Original | |
| 19 | Averaged | | |
| 20 | Original | | |
| 21 | Averaged | | |
| 22 | Original | | |
| 23 | Averaged | | |
| 24 | Original | | |
| 25 | Averaged | | |
| 26 | Averaged | | |
| 27 | Averaged | | |
| 28 | Averaged | | |
| 29 | Averaged | | |
| 30 | Averaged | | |
| 31 | Averaged | | |
| 32 | Averaged | | |
| 33 | Averaged | | |
| 34 | Averaged | | |

UPPER ADJACENT PIXEL

| MiP mode k | SIZE IDENTIFIER (MipSizeId) | | |
|---|---|---|---|
| | 0 | 1 | 2 |
| 0 | Original | Original | Averaged |
| 1 | Averaged | Averaged | Averaged |
| 2 | Original | Original | Averaged |
| 3 | Original | Original | Original |
| 4 | Averaged | Original | Original |
| 5 | Original | Averaged | Original |
| 6 | Averaged | Averaged | Averaged |
| 7 | Original | Averaged | Original |
| 8 | Averaged | Averaged | Averaged |
| 9 | Averaged | Original | Original |
| 10 | Averaged | Averaged | Original |
| 11 | Averaged | Original | |
| 12 | Averaged | Averaged | |
| 13 | Original | Original | |
| 14 | Averaged | Averaged | |
| 15 | Averaged | Original | |
| 16 | Averaged | Original | |
| 17 | Original | Averaged | |
| 18 | Original | Original | |
| 19 | Original | | |
| 20 | Original | | |
| 21 | Original | | |
| 22 | Original | | |
| 23 | Original | | |
| 24 | Original | | |
| 25 | Original | | |
| 26 | Original | | |
| 27 | Original | | |
| 28 | Original | | |
| 29 | Original | | |
| 30 | Original | | |
| 31 | Averaged | | |
| 32 | Original | | |
| 33 | Original | | |
| 34 | Original | | |

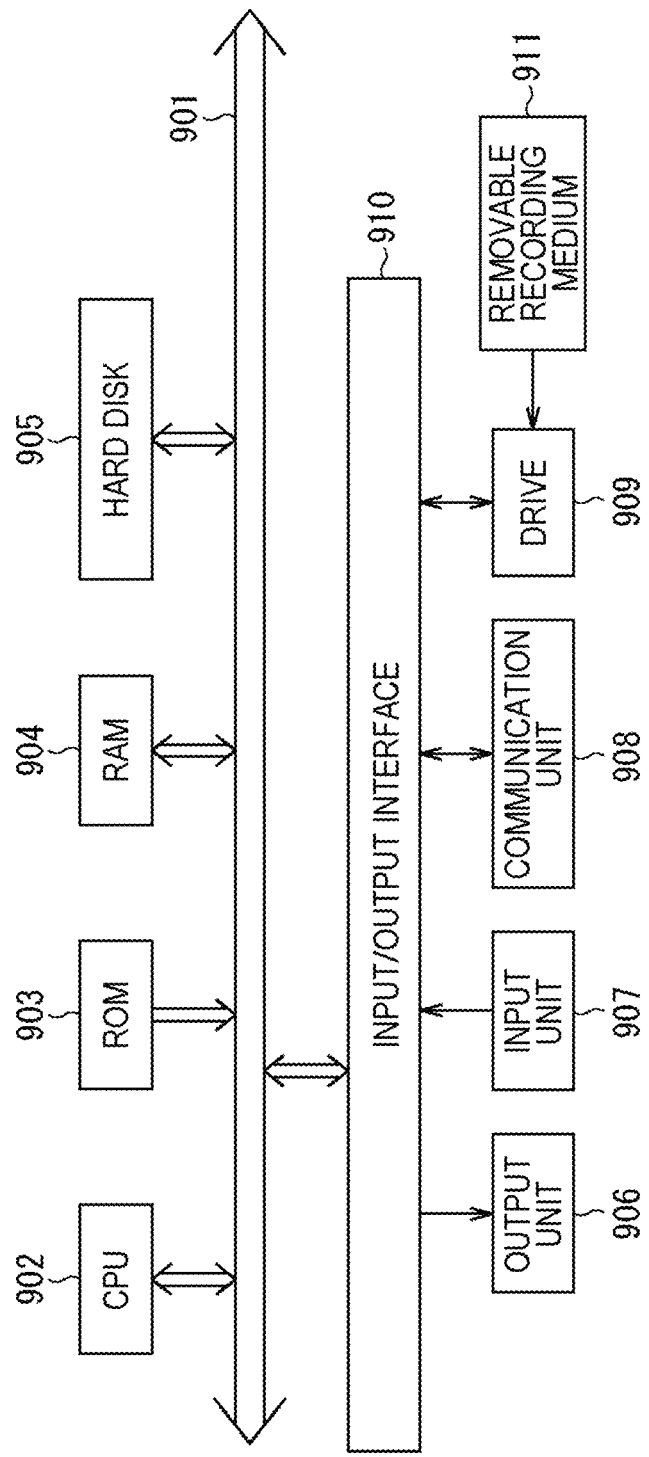

IMAGE PROCESSING DEVICE AND IMAGE PROCESSING METHOD

CROSS-REFERENCE TO RELATED APPLICATIONS

The present application is based on PCT filing PCT/JP2020/021034, filed May 28, 2020, which claims priority to U.S. Provisional Application 62/859,838, filed Jun. 11, 2019, the entire contents of each are incorporated herein by reference.

TECHNICAL FIELD

The present technology relates to an image processing device and an image processing method, and more particularly, to an image processing device and an image processing method capable of improving prediction accuracy, for example.

BACKGROUND ART

Joint standardization organization of ITU-T and ISO/IEC, Joint Video Experts Team (JVET) aims to further improve encoding efficiency compared to H.265/HEVC, and is working on standardization of versatile video coding (VVC), which is the next-generation image encoding method.

In the standardization work of VVC, Non-Patent Document 1 discloses generating a predicted image by averaging a pixel (pixel value) of a reference image, performing a matrix operation (matrix product) using the averaged pixel obtained by the averaging, using a result of the matrix operation, and performing interpolation processing using the averaged pixel as a top adjacent pixel adjacent to the top of the predicted image of the prediction block.

CITATION LIST

Non-Patent Document

Non-Patent Document 1: JVET-N0217-v3: CE3: Affine linear weighted intra prediction (CE3-4.1, CE3-4.2) (version 7—date 2019 Jan. 17)

SUMMARY OF THE INVENTION

Problems to be Solved by the Invention

In the generation of the predicted image described in Non Patent Document 1, the interpolation processing is always performed using the averaged pixel as the top adjacent pixel. Therefore, it cannot be possible to improve the prediction accuracy of the predicted image.

The present technology has been made in view of such a situation, and makes it possible to improve the prediction accuracy of the predicted image.

Solutions to Problems

According to an image processing device of a first aspect of the present technology, the image processing device includes an intra prediction unit configured to generate a predicted image of a current prediction block by performing interpolation processing using an original pixel of a reference image as a top adjacent pixel adjacent to a top of the predicted image of the current prediction block to be encoded, when performing intra prediction using an matrix operation, and an encoding unit configured to encode the current prediction block using the predicted image generated by the intra prediction unit.

According to an image processing method of a first aspect of the present technology, the image processing method includes an intra prediction process of generating a predicted image of a current prediction block by performing interpolation processing using an original pixel of a reference image as a top adjacent pixel adjacent to a top of the predicted image of the current prediction block to be encoded, when performing intra prediction using an matrix operation, and an encoding process of encoding the current prediction block using the predicted image generated in the intra prediction process.

According to the image processing device and image processing method of the first aspect of the present technology, the predicted image of the current prediction block is generated by performing the interpolation processing using the original pixel of the reference image as the top adjacent pixel adjacent to the top of the predicted image of the current prediction block to be encoded, when performing the intra prediction using the matrix operation. Then, the current prediction block is encoded using the predicted image.

According to an image processing device of a second aspect of the present technology, the image processing device includes an intra prediction unit configured to generate a predicted image of a current prediction block by performing interpolation processing using an original pixel of a reference image as a top adjacent pixel adjacent to a top of the predicted image of the current prediction block to be decoded, when performing intra prediction using an matrix operation, and a decoding unit configured to decode the current prediction block using the predicted image generated by the intra prediction unit.

According to an image processing method of a second aspect of the present technology, an image processing method includes an intra prediction process of generating a predicted image of a current prediction block by performing interpolation processing using an original pixel of a reference image as a top adjacent pixel adjacent to a top of the predicted image of the current prediction block to be decoded, when performing intra prediction using an matrix operation, and a decoding process of decoding the current prediction block using the predicted image generated in the intra prediction process.

According to the image processing device and image processing method of the second aspect of the present technology, the predicted image of the current prediction block is generated by performing the interpolation processing using the original pixel of the reference image as the top adjacent pixel adjacent to the top of the predicted image of the current prediction block to be decoded, when performing the intra prediction using the matrix operation. Then, the current prediction block is decoded using the predicted image.

Note that the image processing device may be an independent device or an internal block constituting one device.

In addition, the image processing device can be realized by causing a computer to execute a program. The program can be provided by being recorded on a recording medium or by being transmitted through a transmission medium.

BRIEF DESCRIPTION OF DRAWINGS

FIG. 12 is a diagram illustrating an example of pixels selected as a top adjacent pixel and a left adjacent pixel according to a prediction mode k.

FIG. 13 is a block diagram illustrating a configuration example of an embodiment of a computer to which the present technology is applied.

MODE FOR CARRYING OUT THE INVENTION

<References>

Figure 1:
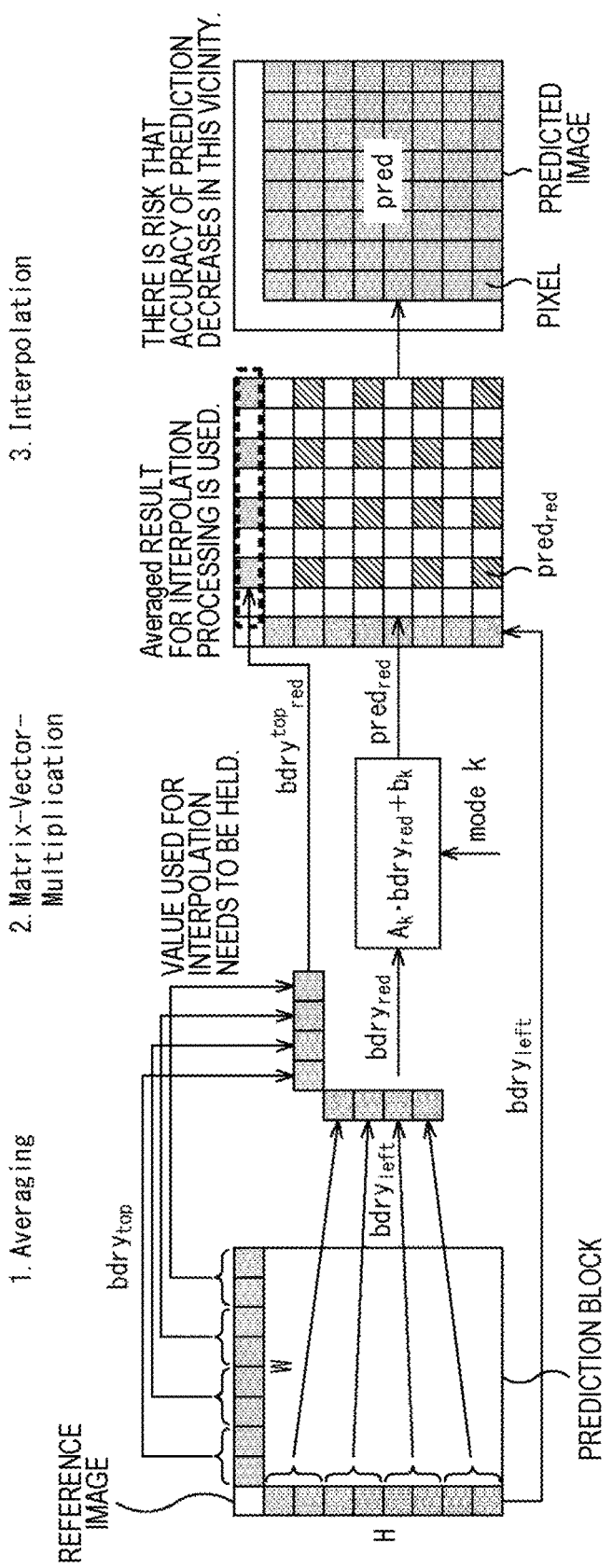
FIG. 1 is a diagram for describing a method of generating a predicted image of matrix-based intra prediction (MIP) proposed by JVET-N0217.

The scope disclosed herein is not limited to the contents of embodiments, and the contents of the following references REF 1 to REF 6, which are known at the time of filing, are also incorporated herein by reference. In other words, the contents described in the following references REF 1 to REF 6 are also the basis for judging the support requirements. For example, even when a quad-tree block structure, a quad tree plus binary tree (QTBT) block structure, and a multi-type tree (MTT) block structure are not directly defined in the detailed description of invention, they are within the scope of the present disclosure and shall meet the support requirements of the claims. In addition, even when technical terms such as parsing, syntax, and semantics are not directly defined in the detailed description of the invention, similarly, they are within the scope of the present disclosure and shall meet the support requirements of the claims.

REF 1: Recommendation ITU-T H.264 (04/2017) "Advanced video coding for generic audiovisual services", April 2017

REF 2: Recommendation ITU-T H.265 (02/2018) "High efficiency video coding", February 2018

REF 3: Benjamin Bross, Jianle Chen, Shan Liu, Versatile Video Coding (Draft 5), JVET-N1001-v7 (version 7—date 2019 May 29)

REF 4: Jianle Chen, Yan Ye, Seung Hwan Kim, Algorithm description for Versatile Video Coding and Test Model 5 (VTM 5), JVET-N1002-v1

REF 5: JVET-N0217-v3: CE3: Affine linear weighted intra prediction (CE3-4.1, CE3-4.2) (version 7—date 2019 Jan. 17)

REF 6: JVET-M0043-v2: CE3: Affine linear weighted intra prediction (test 1.2.1, test 1.2.2) (version 2—date 2019 Jan. 9)

<Definition>

The adjacent includes not only a case in which one pixel (one line) is adjacent to the current pixel of interest, but also a case in which a plurality of pixels (a plurality of lines) is adjacent. Therefore, the adjacent pixel includes not only a pixel at a position of one pixel directly adjacent to a current pixel, but also pixels at positions of a plurality of pixels continuously adjacent to the current pixel.

Down-sampling means reducing the number of pixels. Therefore, the down-sampling includes reducing the number of pixels by using calculations such as averaging or median, or reducing the number of pixels without the calculations.

The prediction block means a block (prediction unit (PU)) that is a processing unit upon performing intra prediction, and also includes sub-blocks in the prediction block. When the prediction block, an orthogonal transform block (transform unit (TU)), which is a processing unit for performing orthogonal transform, and an encoding block (coding unit (CU)), which is a processing unit for encoding, are unified into the same block, the prediction block, the orthogonal transform block, and the encoding block mean the same block.

The prediction mode of the intra prediction means information comprehensively including various matters related the intra prediction, such as a mode number upon performing the intra prediction, a block size of the prediction block, a mode number of matrix-based intra prediction (MIP) using a matrix operation, a type of matrix used upon performing the matrix operation, and a type of size of a matrix used upon performing the matrix operation.

In the present technology, identification data that identifies a plurality of patterns can be set as a bitstream syntax obtained by encoding an image. The bitstream can include the identification data that identifies various patterns.

As the identification data, for example, in the generation of the predicted image of the intra prediction, data for identifying whether to use the original pixel (pixel value) of the reference image or whether to use (pixel value of) the down-sampled pixel as adjacent pixels adjacent to the prediction block can be adopted. Further, as the identification data, for example, data for identifying whether to use the original pixel of the reference image or whether to use the down-sampled pixel as the top adjacent pixel adjacent to the top of the predicted image of the prediction block and the left adjacent pixel adjacent to the left thereof, respectively, can be adopted.

When the identification data is included in the bitstream, the decoder that decodes the bitstream can perform processing more efficiently by parsing and referencing the identification data.

<Method of Generating Predicted Image Proposed in JVET-N0217>

FIG. 1 is a diagram for describing a method of generating a predicted image of matrix-based intra prediction (MIP) proposed by JVET-N0217 (reference document REF 5).

In JVET-N0217, in the MIP, it has been proposed to generate the predicted image by averaging the pixels (pixel values) of the reference image (decoded image), performing the matrix operation (matrix-vector-multiplication) using the averaged pixels obtained by the averaging, and performing the interpolation processing (interpolation) using the result of the matrix operation and the averaged pixels.

Here, the original pixel of the reference image adjacent to the top of the current prediction block, which is the prediction block to be encoded/decoded is also referred to as a top original pixel. Further, the original pixel of the reference image adjacent to the left of the current prediction block is also referred to as a left original pixel.

Further, a size in a lateral direction (lateral size) of a block is represented by W, and a size in a longitudinal direction (longitudinal size) thereof is represented by H.

In FIG. 1, a block of W×H=8×8 pixels is adopted as the current prediction block.

In the averaging, for the current prediction block, a top original pixel (pixel value) $bdry_{top}$ of the reference image is averaged, and a plurality of averaged pixels (pixel values) $bdry_{red}$ as the down-sampled pixel is generated.

Furthermore, in the averaging, for the current prediction block, a left original pixel $bdry_{left}$ of the reference image is averaged, and the plurality of averaged pixels $bdry_{red}$ as the down-sampled pixel is generated.

When the current prediction block is a block of W×H=8×8 pixels, in the averaging of the top original pixel $bdry_{top}$ and the averaging of the left original pixel $bdry_{left}$, by averaging the two adjacent original pixels of the reference image, the averaged pixels $bdry_{red}$ are generated by four.

In the matrix operation, a matrix $A_k$ and an offset $b_k$ used for the matrix operation are set according to the prediction mode k of the intra prediction. Then, in the matrix operation, the matrix $A_k$ is multiplied by the vector $bdry_{red}$ having the averaging pixel $bdry_{red}$ obtained by averaging as an element. Furthermore, in the matrix operation, the offset $b_k$ is added to the result of the multiplication. As a result, some pixels $pred_{red}$ of the predicted image of the current prediction block are generated.

In the interpolation processing, the interpolation is performed by using the top adjacent pixels adjacent to the top the predicted image of the current prediction block, the left adjacent pixel adjacent to the left of the predicted image of the current prediction block, and some pixels $pred_{red}$ of the predicted image of the current prediction block generated by the matrix operation, and the remaining pixels of the predicted image are generated.

As the top adjacent pixel of the predicted image, among the averaged pixels $bdry_{red}$ of the reference image, the averaged pixel $bdry^{top}_{red}$ generated by using the top original pixel $bdry_{top}$ is used.

As the left adjacent pixel of the predicted image, the left original pixel $bdry_{left}$ of the reference image is used.

Here, positions of an xth pixel from the left and a yth pixel from the top is expressed as (x-1, y-1), and pixels at the position (x-1, y-1) are described as the pixels (x-1, y-1).

When the current prediction block is a block of W×H=8×8 pixels, some pixels $pred_{red}$ of the predicted image generated by the matrix operation are x-1 of the pixels of the predicted image of the current prediction block are pixels (x-1, y-1) (shown with diagonal lines in the figure) at positions where x-1 and y-1 are odd among the pixels of the predicted image of the current prediction block.

In interpolation processing, four averaged pixels $bdry^{top}_{red}$ are arranged as four top adjacent pixels, at a position where x-1 is adjacent, adjacent to the top of the predicted image of the current prediction block. Furthermore, eight left original pixels $bdry_{left}$ are arranged as eight left adjacent pixels adjacent to the left of the predicted image of the current prediction block.

Then, pixels of the predicted image at the positions where x-1 is odd and y-1 is even are generated by the longitudinal (vertical) interpolation using the pixels (x-1, y-1) at the positions where x-1 and y-1 are odd, which are the averaged pixel $bdry^{top}_{red}$ as the top adjacent pixel and the pixel $pred_{red}$ generated by the matrix operation.

Furthermore, the remaining pixels of the predicted image are generated by the lateral (horizontal) interpolation using the left original pixel $bdry_{left}$ as the left adjacent pixel, the pixel $pred_{red}$ generated by matrix operation, and the pixel generated by the longitudinal interpolation.

Then, by combining the pixels generated by the interpolation processing and the pixels generated by the matrix operation, the predicted image (pred) of the current prediction block is generated.

In JVET-N0217, in the interpolation processing, the averaged pixel $bdry^{top}_{red}$ generated by using the top original pixel $bdry_{top}$ of the reference image is used as the top adjacent pixel adjacent to the top of the predicted image of the current prediction block.

That is, the interpolation processing is performed using pixels that are not the actual pixels (original pixels) of the reference image itself.

Therefore, after the matrix operation, it is necessary to hold the averaged pixel $bdry^{top}_{red}$ used upon performing the interpolation processing, and a storage area (memory) for holding the averaged pixel $bdry^{top}_{red}$ is required.

Furthermore, since the interpolation processing is always performed using the averaged pixel $bdry^{top}_{red}$ as the top adjacent pixel, there is a risk that the correlation between the pixel of the prediction block and the pixel of the predicted image generated by using the averaged pixel $bdry^{top}_{red}$ decreases, and the prediction accuracy of the intra prediction, that is, the prediction accuracy of the predicted image cannot be improved, or the prediction accuracy may decrease.

Therefore, in the present technology, in the interpolation processing, the prediction accuracy of the predicted image is improved by using the top original pixel $bdry_{top}$ of the reference image as the top adjacent pixel.

<Image Processing System to which the Present Technology is Applied>

Figure 2:
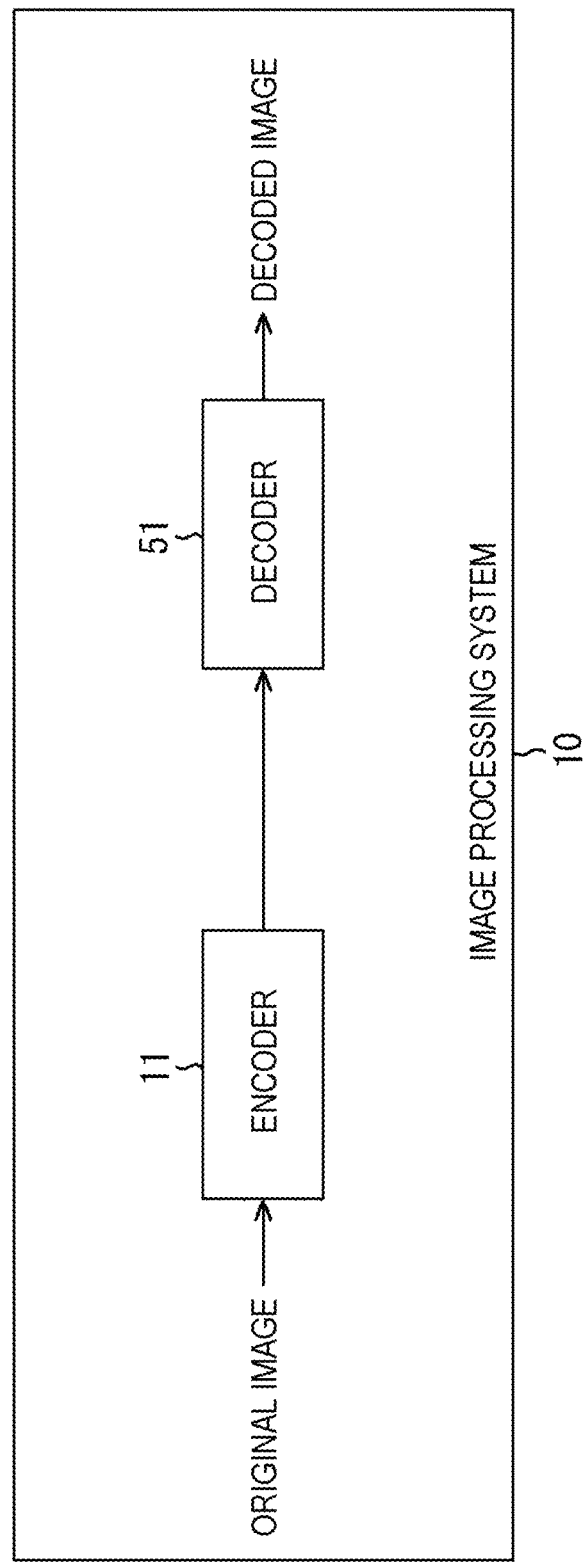
FIG. 2 is a block diagram illustrating a configuration example of an embodiment of an image processing system to which the present technology is applied.

FIG. 2 is a block diagram illustrating a configuration example of an embodiment of an image processing system to which the present technology is applied.

The image processing system 10 has an image processing device as an encoder 11 and an image processing device as a decoder 51.

The encoder 11 encodes the original image to be encoded supplied thereto and outputs an encoded bitstream obtained by the encoding. The encoded bitstream is supplied to the decoder 51 via a recording medium or a transmission medium (not illustrated).

The decoder 51 decodes the encoded bitstream supplied thereto and outputs the decoded image obtained by the decoding.

<Configuration Example of Encoder 11>

Figure 3:
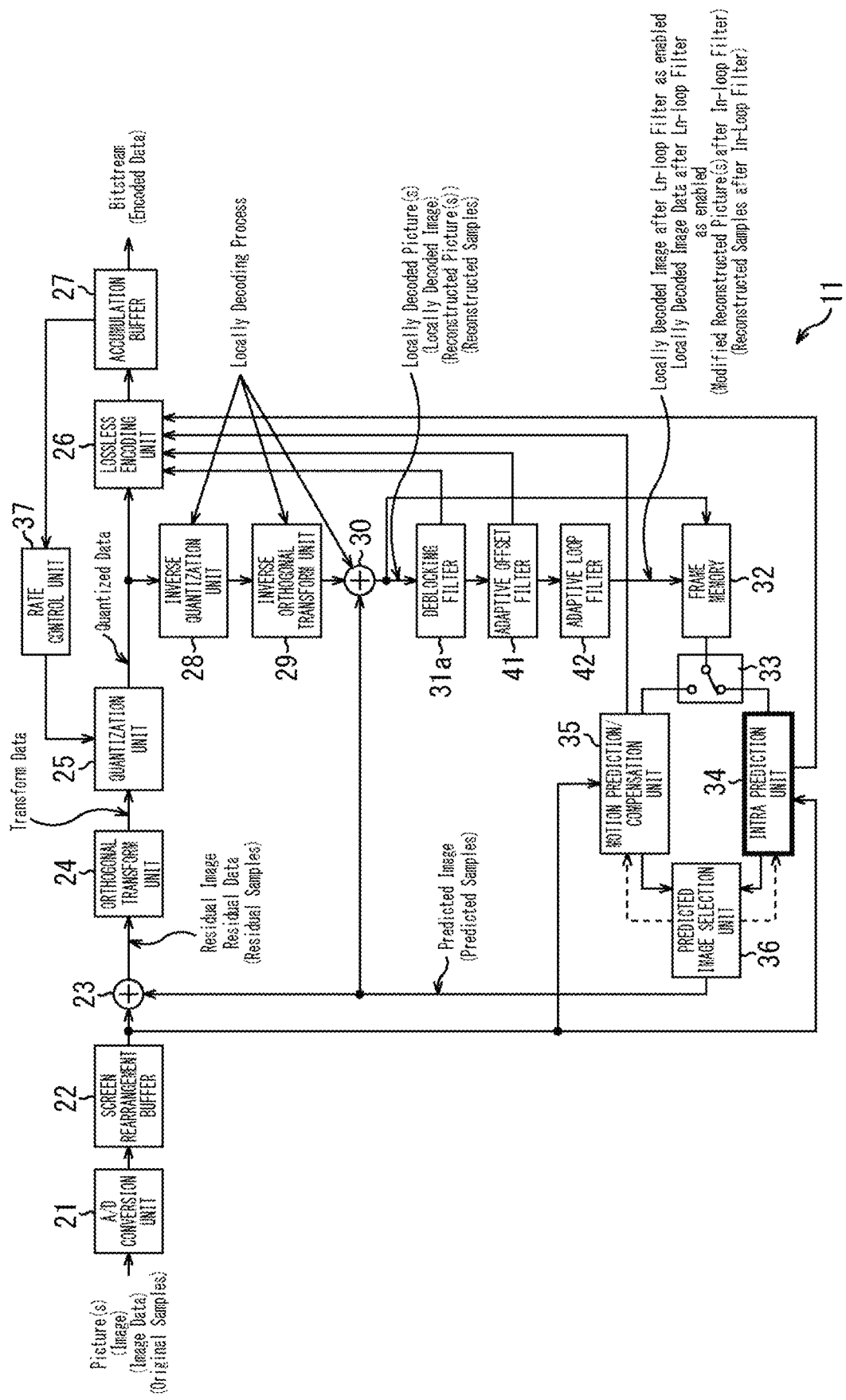
FIG. 3 is a block diagram illustrating a configuration example of an encoder 11.

FIG. 3 is a block diagram illustrating a configuration example of the encoder 11 of FIG. 2.

Note that in the block diagram described below, the description of the line that supplies the information (data) required for the processing of each block is omitted as appropriate in order to avoid complicating the diagram.

In FIG. 3, the encoder 11 includes an A/D conversion unit 21, a rearrangement buffer 22, a calculation unit 23, an orthogonal transform unit 24, a quantization unit 25, a reversible encoding unit 26, and an accumulation buffer 27. Further, the encoder 11 includes an inverse quantization unit 28, an inverse orthogonal transform unit 29, a calculation unit 30, a frame memory 32, a selection unit 33, an intra prediction unit 34, a motion prediction/compensation unit 35, a prediction image selection unit 36, and a rate control unit 37. Further, the encoder 11 has a deblocking filter 31a, an adaptive offset filter 41, and an adaptive loop filter (ALF) 42.

The A/D conversion unit 21 A/D-converts the original image (encoding target) of the analog signal into an original image of a digital signal, and supplies and stores the A/D converted original image to and in the rearrangement buffer 22. Note that when the original image of the digital signal is supplied to the encoder 11, the encoder 11 can be configured without providing the A/D conversion unit 21.

The rearrangement buffer 22 rearranges the frame of the original image from the display order to the encoding (decoding) order according to a group of picture (GOP), and supplies the frame to the calculation unit 23, the intra prediction unit 34, and the motion prediction/compensation unit 35.

The calculation unit 23 subtracts the predicted image supplied from the intra prediction unit 34 or the motion prediction/compensation unit 35 from the original image from the rearrangement buffer 22 via the prediction image selection unit 36, and supplies the residual (predicted residual) obtained by the subtraction to the orthogonal transform unit 24.

The orthogonal transform unit 24 performs an orthogonal transform such as a discrete cosine transform or a Karhunen-Loève transform on the residual supplied from the calculation unit 23, and supplies the orthogonal transform coefficient obtained by the orthogonal transform to the quantization unit 25.

The quantization unit 25 quantizes the orthogonal transform coefficient supplied from the orthogonal transform unit 24. The quantization unit 25 sets a quantization parameter based on a target value of a code amount (code amount target value) supplied from the rate control unit 37, and performs the quantization of the orthogonal transform coefficient. The quantization unit 25 supplies encoded data, which is the quantized orthogonal transform coefficient, to the reversible encoding unit 26.

The reversible encoding unit 26 encodes the quantized orthogonal transform coefficient as the encoded data from the quantization unit 25 by a predetermined reversible encoding method.

Further, the reversible encoding unit 26 acquires encoding information required for decoding by the decoding device 170 from each block among encoding information related to the predictive encoding in the encoder 11.

Here, as the encoding information, for example, there are a prediction mode of intra prediction or inter prediction, motion information such as motion vector, a code amount target value, a quantization parameter, picture types (I, P, B), filter parameters such as deblocking filter 31a and the adaptive offset filter 41, and the like.

The prediction mode can be acquired from the intra prediction unit 34 or motion prediction/compensation unit 35. The motion information can be acquired from the motion prediction/compensation unit 35. The filter parameters of the deblocking filter 31a and the adaptive offset filter 41 can be acquired from the deblocking filter 31a and the adaptive offset filter 41, respectively.

The reversible encoding unit 26 encodes the coding information by, for example, variable length coding or arithmetic coding such as context-adaptive variable length coding (CAVLC) or context-adaptive binary arithmetic coding (CABAC), or other reversible coding methods, generates the encoded bitstream including (multiplexed) the encoded information after encoding, the encoded data from the quantization unit 25 and supplied the generated encoded bitstream to the accumulation buffer 27.

Here, the above calculation unit 23 or reversible encoding unit 26 functions as an encoding unit for encoding an image.

The accumulation buffer 27 temporarily accumulates the encoded bitstream supplied from the reversible encoding unit 26. The encoded bitstream stored in the accumulation buffer 27 is read and transmitted at a predetermined timing.

The encoded data, which is the orthogonal transform coefficient quantized in the quantization unit 25, is not only supplied to the reversible encoding unit 26, but also to the inverse quantization unit 28. The inverse quantization unit 28 dequantizes the quantized orthogonal transform coefficient by a method corresponding to the quantization by the quantization unit 25, and supplies the orthogonal transform coefficient obtained by the inverse quantization is transmitted to the inverse orthogonal transform unit 29.

The inverse orthogonal transform unit 29 inversely orthogonal transforms the orthogonal transform coefficient supplied from the inverse quantization unit 28 by a method corresponding to the orthogonal transform processing by the orthogonal transform unit 24, and supplies the residuals obtained as a result of the inverse orthogonal transform to the calculation unit 30.

The calculation unit 30 adds the predicted image supplied from the intra prediction unit 34 or the motion prediction/compensation unit 35 via the prediction image selection unit 36 to the residual supplied from the inverse orthogonal transform unit 29, thereby obtaining and output (a part of) the decoded image from which the original image is decoded.

The decoded image output by the calculation unit 30 is supplied to the deblocking filter 31a or the frame memory 32.

The frame memory 32 temporarily stores the decoded image supplied from the calculation unit 30, and the decoded image (filtered image) supplied from the ALF 42 and to which the deblocking filter 31a, the adaptive offset filter 41, and the ALF 42 are applied. The decoded image stored in the frame memory 32 is supplied to the selection unit 33 as the reference image used for generating the predicted image at a required timing.

The selection unit 33 selects a supply destination of the reference image supplied from the frame memory 32. When the intra prediction is performed in the intra prediction unit 34, the selection unit 33 supplies the reference image supplied from the frame memory 32 to the intra prediction unit 34. When the inter prediction is performed in the motion prediction/compensation unit 35, the selection unit 33 supplies the reference image supplied from the frame memory 32 to the motion prediction/compensation unit 35.

The intra prediction unit 34 performs the intra prediction (in-screen prediction) using the original image supplied from the rearrangement buffer 22 and the reference image supplied from the frame memory 32 via the selection unit 33. The intra prediction unit 34 selects the prediction mode of the optimum intra prediction based on a predetermined cost function, and supplies the predicted image generated from the reference image in the prediction mode of the optimum intra prediction to the prediction image selection unit 36. Further, the intra prediction unit 34 appropriately supplies the prediction mode of the intra prediction selected based on the cost function to the reversible encoding unit 26 and the like.

The motion prediction/compensation unit 35 performs the motion prediction using the original image supplied from the rearrangement buffer 22 and the reference image supplied from the frame memory 32 via the selection unit 33. Further, the motion prediction/compensation unit 35 performs motion compensation according to the motion vector detected by the motion prediction and generates the predicted image. The motion prediction/compensation unit 35 performs inter prediction in a prediction mode of a plurality of inter predictions prepared in advance, and generates the predicted image from the reference image.

The motion prediction/compensation unit 35 selects the prediction mode of the optimum inter prediction from the prediction mode of the plurality of inter predictions based on a predetermined cost function. Furthermore, the motion prediction/compensation unit 35 supplies the predicted image generated in the prediction mode of the optimum inter prediction to the prediction image selection unit 36.

In addition, the motion prediction/compensation unit 35 supplies the prediction mode of the optimum inter prediction selected based on the cost function or motion information such as a motion vector required to decode the encoded data encoded in the prediction mode of the inter prediction to the reversible encoding unit 26.

The prediction image selection unit 36 selects a supply source of the predicted image to be supplied to the calculation unit 23 and the calculation unit 30 from the intra prediction unit 34 and the motion prediction/compensation unit 35, and selects the predicted image supplied from the selected supply source to the calculation unit 23 and the calculation unit 30.

The rate control unit 37 controls the rate of the quantization operation of the quantization unit 25 based on the code amount of the encoded bitstream accumulated in the accumulation buffer 27 so that overflow or underflow does not occur. That is, the rate control unit 37 sets the target code amount of the encoded bitstream and supplies the set target code amount to the quantization unit 25 so that the overflow and underflow of the accumulation buffer 27 does not occur.

The deblocking filter 31a applies the deblocking filter to the decoded image from the calculation unit 30 as necessary, and supplies the decoded image (filtered image) to which the deblocking filter is applied, or the decoded image to which the deblocking filter is not applied to the adaptive offset filter 41.

The adaptive offset filter 41 applies the adaptive offset filter to the decoded image from the deblocking filter 31a as necessary, and supplies the decoded image (filtered image) to which the adaptive offset filter is applied or the decoded image to which the adaptive offset filter is not applied is applied to the ALF 42.

The ALF 42 applies the ALF to the decoded image from the adaptive offset filter 41 as necessary, and supplies the decoded image to which the ALF is applied or the decoded image to which ALF is not applied to the frame memory 32.

<Encoding Processing>

Figure 4:
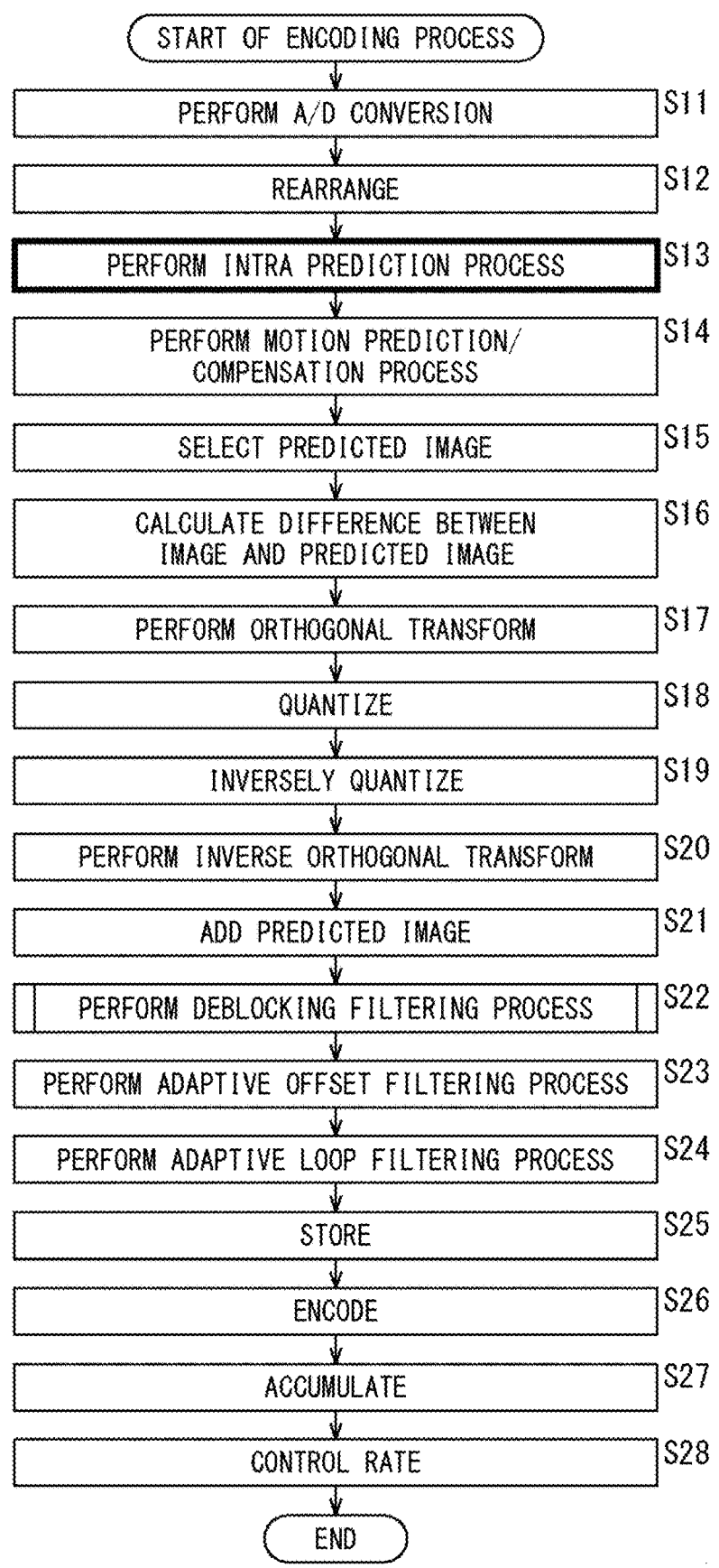
FIG. 4 is a flowchart illustrating an example of encoding processing of the encoder 11.

FIG. 4 is a flowchart illustrating an example of the encoding processing of the encoder 11 of FIG. 3.

The order of each step of encoding processing illustrated in FIG. 4 is an order for convenience of explanation, and each step of actual encoding processing is performed in a necessary order in parallel as appropriate. The same also applies to the processes described later.

In step S11, in the encoder 11, the A/D conversion unit 21 A/D-converts an original image and supplies the A/D-converted original image to the rearrangement buffer 22, and the process proceeds to step S12.

In step S12, the rearrangement buffer 22 stores the original images from the A/D conversion unit 21, rearranges the original images in the encoding order and outputs the rearranged original images, and the process proceeds to step S13.

In step S13, the intra prediction unit 34 performs the intra prediction, and the process proceeds to step S14. In step S14, the motion prediction/compensation unit 35 performs inter prediction for motion prediction or motion compensation, and the process proceeds to step S15.

In the intra prediction of the intra prediction unit 34 and the inter prediction of the motion prediction/compensation unit 35, the cost functions of various prediction modes are calculated and the predicted image is generated.

In step S15, the prediction image selection unit 36 determines the optimum prediction mode based on each cost function obtained by the intra prediction unit 34 and the motion prediction/compensation unit 35. Then, the prediction image selection unit 36 selects and outputs the predicted image of the optimum prediction mode from the predicted image generated by the intra prediction unit 34 and the predicted image generated by the motion prediction/compensation unit 35, and the process proceeds from step S15 to step S16.

In step S16, the calculation unit 23 calculates the residual between the target image to be encoded, which is the original image output by the rearrangement buffer 22, and the predicted image output by the prediction image selection unit 36, and supplies the calculated residual to the orthogonal transform unit 24, and the process proceeds to step S17.

In step S17, the orthogonal transform unit 24 orthogonal transforms the residual from the calculation unit 23 and supplies the resulting orthogonal transform coefficient to the quantization unit 25, and the process proceeds to step S18.

In step S18, the quantization unit 25 quantizes the orthogonal transform coefficient from the orthogonal transform unit 24 and supplies the quantization coefficient obtained by the quantization to the reversible encoding unit 26 and the inverse quantization unit 28, and the process proceeds to step S19.

In step S19, the inverse quantization unit 28 inversely quantizes the quantization coefficient from the quantization unit 25 and supplies the resulting orthogonal transform coefficient to the inverse orthogonal transform unit 29, and the process proceeds to step S20. In step S20, the inverse orthogonal transform unit 29 inversely orthogonal transforms the orthogonal transform coefficient from the inverse quantization unit 28 and supplies the resulting residual to the calculation unit 30, and the process proceeds to step S21.

In step S21, the calculation unit 30 adds the residual from the inverse orthogonal transform unit 29 and the predicted image output by the prediction image selection unit 36, and generates the decoded image corresponding to the original image that becomes the target of the calculation of the residuals by the calculation unit 23. The calculation unit 30 supplies the decoded image to the deblocking filter 31a, and the process proceeds from step S21 to step S22.

In step S22, the deblocking filter 31a applies the deblocking filter to the decoded image from the calculation unit 30 and supplies the resulting filtered image to the adaptive offset filter 41, and the process proceeds to step S23.

In step S23, the adaptive offset filter 41 applies the adaptive offset filter to the filtered image from the deblocking filter 31a and supplies the resulting filtered image to ALF 42, and the process proceeds to step S24.

In step S24, the ALF 42 applies ALF to the filtered image from the adaptive offset filter 41 and supplies the resulting filtered image to the frame memory 32, and the process proceeds to step S25.

In step S25, the frame memory 32 stores the filtered image supplied from the ALF 42, and the process proceeds to step S26. The filtered image stored in the frame memory 32 is used as a reference image from which the predicted image is generated in steps S13 and S14.

In step S26, the reversible encoding unit 26 encodes the encoded data, which is the quantization coefficient from the quantization unit 25, and generates the encoded bitstream including the encoded data. Furthermore, the reversible encoding unit 26 encodes the encoding information, such as the quantization parameter used for the quantization in the quantization unit 25, the prediction mode obtained by the intra prediction in the intra prediction unit 34, the prediction mode or motion information obtained by the inter prediction in the motion prediction/compensation unit 35, or the filter parameters of the deblocking filter 31a and the adaptive offset filter 41, as necessary, and includes the encoded information in the encoded bitstream.

Then, the reversible encoding unit 26 supplies the encoded bitstream to the accumulation buffer 27, and the process proceeds from step S26 to step S27.

In step S27, the accumulation buffer 27 accumulates the encoded bitstream from the reversible encoding unit 26, and the process proceeds to step S28. The encoded bitstream accumulated in the accumulation buffer 27 is appropriately read and transmitted.

In step S28, the rate control unit 37 controls the quantization operation of the quantization unit 25 based on the code amount (generated code amount) of the encoded bitstream accumulated in the accumulation buffer 27 so that overflow or underflow does not occur, and the encoding processing ends.

<Configuration Example of Decoder 51>

Figure 5:
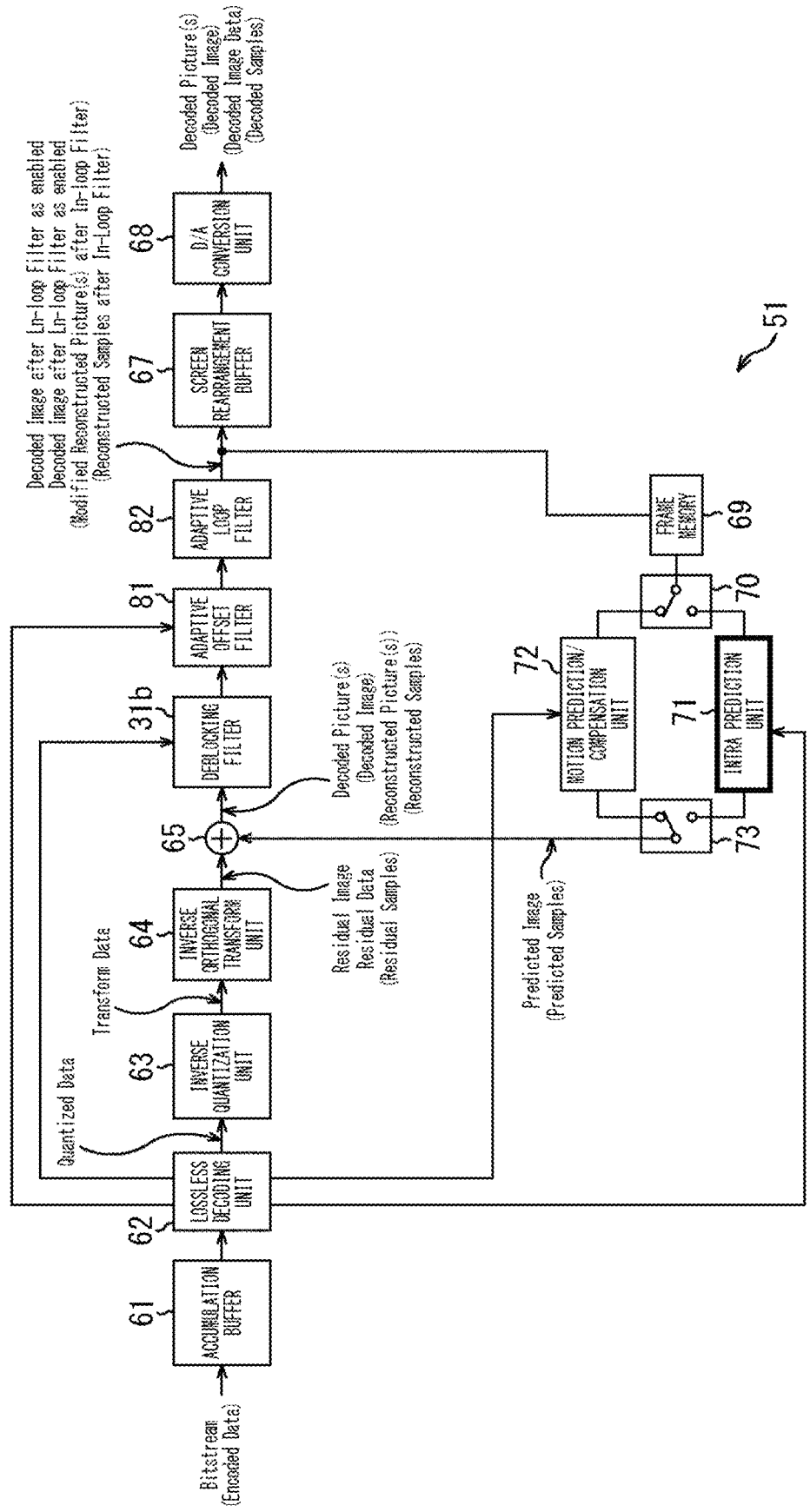
FIG. 5 is a block diagram illustrating a configuration example of a decoder 51.

FIG. 5 is a block diagram illustrating a configuration example of the decoder 51 of FIG. 2.

In FIG. 5, the decoder 51 has an accumulation buffer 61, a reversible decoding unit 62, an inverse quantization unit 63, an inverse orthogonal transform unit 64, a calculation unit 65, a rearrangement buffer 67, and a D/A conversion unit 68. Further, the decoder 51 has a frame memory 69, a selection unit 70, an intra prediction unit 71, a motion prediction/compensation unit 72, and a selection unit 73. Further, the decoder 51 has a deblocking filter 31b, an adaptive offset filter 81, and an ALF 82.

The accumulation buffer 61 temporarily accumulates the encoded bitstream transmitted from the encoder 11 and supplies the encoded bitstream to the reversible decoding unit 62 at a predetermined timing.

The reversible decoding unit 62 receives the encoded bitstream from the accumulation buffer 61 and decodes the received encoded bitstream by a method corresponding to the encoding method of the reversible encoding unit 26 in FIG. 3

Then, the reversible decoding unit 62 supplies the quantization coefficient as the encoded data included in the decoding result of the encoded bitstream to the inverse quantization unit 63.

Further, the reversible decoding unit 62 has a function of performing parsing. The reversible decoding unit 62 parses the necessary encoding information included in the decoding result of the encoded bitstream and supplies the encoding information to the intra prediction unit 71, the motion prediction/compensation unit 72, the deblocking filter 31b, the adaptive offset filter 81, and other necessary blocks.

The inverse quantization unit 63 inversely quantizes the quantization coefficient as the encoded data from the reversible decoding unit 62 by the method corresponding to the quantization method of the quantization unit 25 in FIG. 3, and supplies the orthogonal transform coefficient obtained by the inverse quantization to the inverse orthogonal transform unit 64.

The inverse orthogonal transform unit 64 inversely orthogonal transforms the orthogonal transform coefficient supplied from the inverse quantization unit 63 by the method corresponding to the orthogonal transform method of the orthogonal transform unit 24 in FIG. 3, and supplies the resulting residual to the calculation unit 65.

In addition to the residual being supplied from the inverse orthogonal transform unit 64 to the calculation unit 65, the predicted image is supplied from the intra prediction unit 71 or the motion prediction/compensation unit 72 via the selection unit 73.

The calculation unit 65 adds the residual from the inverse orthogonal transform unit 64 and the predicted image from the selection unit 73, generates the decoded image, and supplies the generated decoded image to the deblocking filter 31b.

Here, the above reversible decoding unit 62 or calculation unit 65 constitutes a decoding unit for decoding an image.

The rearrangement buffer 67 temporarily stores the decoded image supplied from the ALF 82, rearranges the arrangement of the frames (pictures) of the decoded image from the encoding (decoding) order to the display order, and supplies the rearranged frame to the D/A conversion unit 68.

The D/A conversion unit 68 D/A-converts the decoded image supplied from the rearrangement buffer 67 and outputs the D/A-converted decoded image to a display (not illustrated) for display. Note that when the device connected to the decoder 51 accepts an image of a digital signal, the decoder 51 can be configured without providing the D/A conversion unit 68.

The frame memory 69 temporarily stores the decoded image supplied from the ALF 82. Furthermore, the frame memory 69 supplies the decoded image to the selection unit 70 as a reference image for generating the predicted image at a predetermined timing or based on an external request such as the intra prediction unit 71 or the motion prediction/compensation unit 72.

The selection unit 70 selects the supply destination of the reference image supplied from the frame memory 69. When decoding the image encoded by the intra prediction, the selection unit 70 supplies the reference image supplied from the frame memory 69 to the intra prediction unit 71. In addition, when decoding the image encoded by the inter prediction, the selection unit 70 supplies the reference image supplied from the frame memory 69 to the motion prediction/compensation unit 72.

Similar to the intra prediction unit 34 of FIG. 3, the intra prediction unit 71 performs the intra prediction using the reference image supplied from the frame memory 69 via the selection unit 70, according to the prediction mode included in the encoding information supplied from the reversible decoding unit 62. Then, the intra prediction unit 71 supplies the predicted image obtained by the intra prediction to the selection unit 73.

Similar to the motion prediction/compensation unit 35 of FIG. 3, the motion prediction/compensation unit 72 performs the inter prediction using the reference image supplied from the frame memory 69 via the selection unit 70, according to the prediction mode included in the encoding information supplied from the reversible decoding unit 62. The inter prediction is performed by using the motion information and the like included in the encoding information supplied from the reversible decoding unit 62 as necessary.

The motion prediction/compensation unit 72 supplies the predicted image obtained by the inter prediction to the selection unit 73.

The selection unit 73 selects the predicted image supplied from the intra prediction unit 71 or the predicted image supplied from the motion prediction/compensation unit 72, and supplies the predicted image to the calculation unit 65.

The deblocking filter 31b applies the deblocking filter to the decoded image from the calculation unit 65 according to the filter parameter included in the encoding information supplied from the reversible decoding unit 62. The deblocking filter 31b supplies the decoded image (filtered image) to which the deblocking filter is applied or the decoded image to which the deblocking filter is not applied to the adaptive offset filter 81.

The adaptive offset filter 81 applies the adaptive offset filter to the decoded image from the deblocking filter 31b as necessary according to the filter parameter included in the encoding information supplied from the reversible decoding unit 62. The adaptive offset filter 81 supplies the decoded image (filtered image) to which the adaptive offset filter is applied or the decoded image to which the adaptive offset filter is not applied to the ALF 82.

The ALF 82 applies the ALF to the decoded image from the adaptive offset filter 81 as necessary, and supplies the decoded image to which the ALF is applied or the decoded image to which ALF is not applied to the rearrangement buffer 67 and the frame memory 69.

<Decoding Processing>

Figure 6:
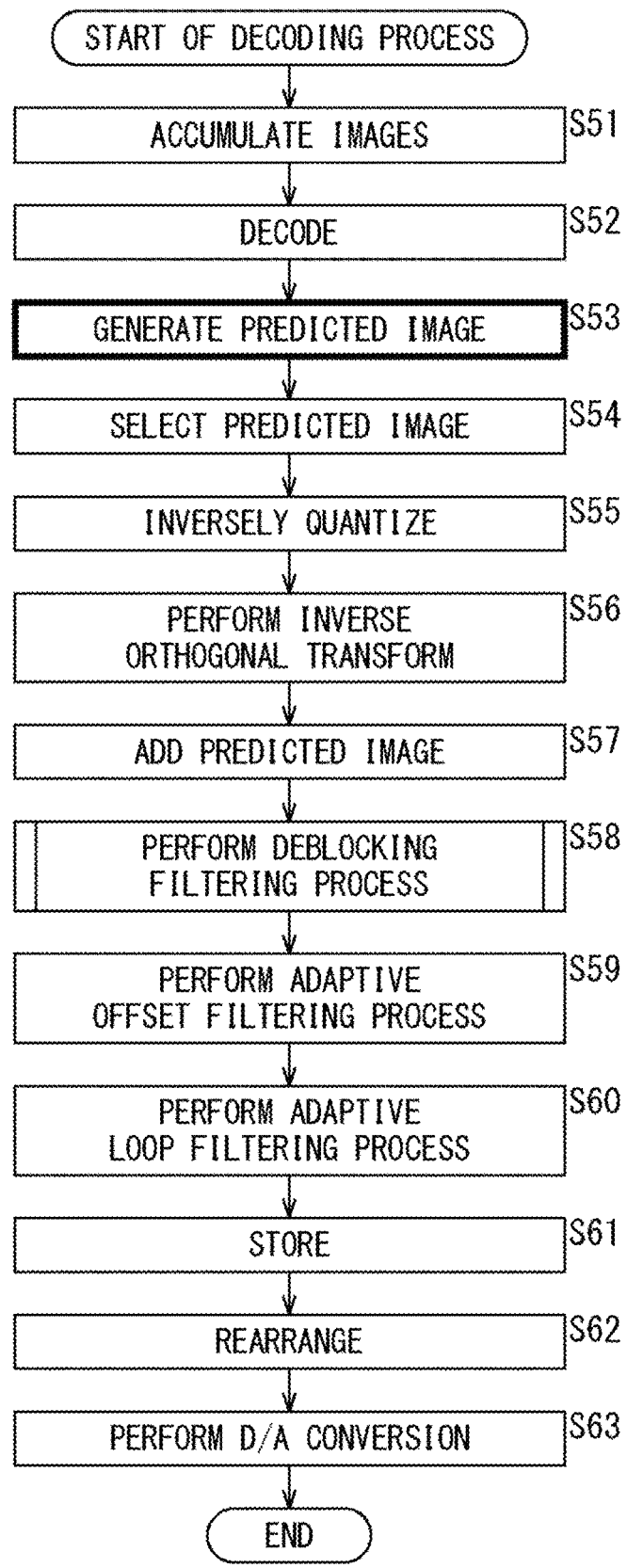
FIG. 6 is a flowchart illustrating an example of decoding processing of the decoder 51.

FIG. 6 is a flowchart illustrating an example of the decoding processing of the decoder 51 of FIG. 5.

In step S51, in decoding processing, the accumulation buffer 61 temporarily stores the encoded bitstream transmitted from the encoder 11 and supplies the stored encoded bitstream to the reversible decoding unit 62 as appropriate, and the process proceeds to step S52.

In step S52, the reversible decoding unit 62 receives and decodes the encoded bitstream supplied from the accumulation buffer 61, and supplies the quantization coefficient as the encoded data included in the decoding result of the encoded bitstream to the inverse quantization unit 63.

Further, the reversible decoding unit 62 parses the encoding information included in the decoding result of the encoded bitstream. Then, the reversible decoding unit 62 supplies the necessary encoding information to the intra prediction unit 71, the motion prediction/compensation unit 72, the deblocking filter 31b, the adaptive offset filter 81, and other necessary blocks.

Then, the process proceeds from step S52 to step S53, and the intra prediction unit 71 or the motion prediction/compensation unit 72 performs the intra prediction or the inter prediction generating the predicted image, according to the reference image supplied from the frame memory 69 via the selection unit 70 and the encoding information supplied from the reversible decoding unit 62. Then, the intra prediction unit 71 or the motion prediction/compensation unit 72 supplies the predicted image obtained by the intra prediction or the inter prediction to the selection unit 73, and the process proceeds from step S53 to step S54.

In step S54, the selection unit 73 selects the predicted image supplied from the intra prediction unit 71 or the motion prediction/compensation unit 72 and supplies the selected predicted image to the calculation unit 65, and the process proceeds to step S55.

In step S55, the inverse quantization unit 63 inversely quantizes the quantization coefficient from the reversible decoding unit 62 and supplies the resulting orthogonal transform coefficient to the inverse orthogonal transform unit 64, and the process proceeds to step S56.

In step S56, the inverse orthogonal transform unit 64 inversely orthogonal transforms the orthogonal transform coefficient from the inverse quantization unit 63 and supplies the resulting residual to the calculation unit 65, and the process proceeds to step S57.

In step S57, the calculation unit 65 generates the decoded image by adding the residual from the inverse orthogonal transform unit 64 and the predicted image from the selection unit 73. Then, the calculation unit 65 supplies the decoded image to the deblocking filter 31b, and the process proceeds from step S57 to step S58.

In step S58, the deblocking filter 31b applies the deblocking filter to the decoded image from the calculation unit 65 according to the filter parameter included in the encoding information supplied from the reversible decoding unit 62. The deblocking filter 31b supplies the filtered image obtained as a result of applying the deblocking filter to the adaptive offset filter 81, and the process proceeds from step S58 to step S59.

In step S59, the adaptive offset filter 81 applies the adaptive offset filter to the filtered image from the deblocking filter 31b according to the filter parameter included in the encoding information supplied from the reversible decoding unit 62. The adaptive offset filter 81 supplies the filtered image obtained as a result of applying the adaptive offset filter to the ALF 82, and the process proceeds from step S59 to step S60.

The ALF 82 applies ALF to the filtered image from the adaptive offset filter 81 and supplies the resulting filtered image to the rearrangement buffer 67 and the frame memory 69, and the process proceeds to step S61.

In step S61, the frame memory 69 temporally stores the filtered image supplied from the ALF 82, and the process proceeds to step S62. The filtered image (decoded image) stored in the frame memory 69 is used as the reference image from which the predicted image is generated by the intra prediction or the inter prediction in step S53.

In step S62, the rearrangement buffer 67 rearranges the filtered images supplied from ALF 82 in the display order and supplies the rearranged filtered images to the D/A conversion unit 68, and the process proceeds to step S63.

In step S63, the D/A conversion unit 68 D/A-converts the filtered image from the rearrangement buffer 67, and the process ends the decoding processing. The filter image (decoded image) after D/A conversion is output and displayed on a display (not illustrated).

<Configuration Example of Intra Prediction Unit 34>

Figure 7:
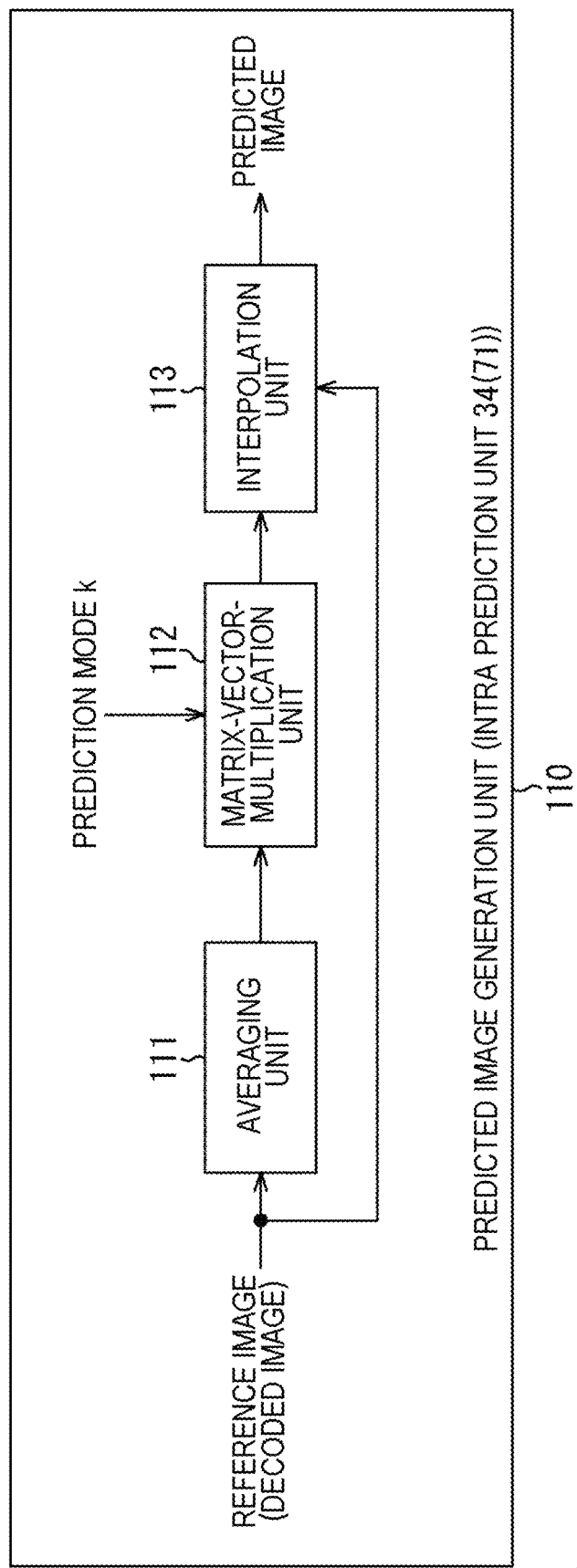
FIG. 7 is a block diagram illustrating a configuration example of an intra prediction unit 34.

FIG. 7 is a block diagram illustrating a configuration example of the intra prediction unit 34.

Note that FIG. 7 illustrates only the predicted image generation unit 110, which is a part that generates the predicted image of the MIP, in the intra prediction unit 34. The intra prediction unit 71 also has a predicted image generation unit similar to the predicted image generation unit 110.

The predicted image generation unit 110 includes an averaging unit 111, a matrix-vector-multiplication unit 112, and an interpolation unit 113.

The reference image (as decoded image) for the current prediction block is supplied from the selection unit 33 to the averaging unit 111.

The averaging unit 111 averages (pixel value of) the top original pixel of the reference image for the current prediction block, and generates (pixel values of) the plurality of averaged pixels as the down-sampled pixel.

In addition, the averaging unit 111 averages the left original pixel of the reference image for the current prediction block, and generates the plurality of averaged pixels as the down-sampled pixel.

The averaging unit 111 supplies the averaged pixel to the matrix-vector-multiplication unit 112.

The matrix-vector-multiplication unit 112 is supplied with the prediction mode k of the intra prediction.

The matrix-vector-multiplication unit 112 sets the matrix $A_k$ and the vector offset $b_k$ used for the matrix operation according to the prediction mode k. Then, the matrix-vector-multiplication unit 112 performs multiplication between the matrix $A_k$ and the vector having the averaged pixel of the averaging unit 111 as an element as the matrix operation. Further, the matrix-vector-multiplication unit 112 adds an offset $b_k$ to the result of multiplication as the matrix operation, thereby generating some pixels of the predicted image of the current prediction block and supplying the pixels to the interpolation unit 113.

The reference image is supplied to the interpolation unit 113.

The interpolation unit 113 performs the interpolation processing by using the top adjacent pixel adjacent to the top of the predicted image of the current prediction block, the left adjacent pixel adjacent to the left of the predicted image of the current prediction block, and some pixels of the predicted image of the current prediction block from the matrix-vector-multiplication unit 112.

The interpolation unit 113 generates the remaining pixels of the predicted image of the current prediction block by the interpolation processing, and generates (completes) the predicted image of the current prediction block by combining with some pixels of the predicted image from the matrix-vector-multiplication unit 112.

The interpolation unit 113 uses the top original pixel of the reference image as the top adjacent pixel of the predicted image, and uses the left original pixel of the reference image as the left adjacent pixel of the predicted image.

Figure 8:
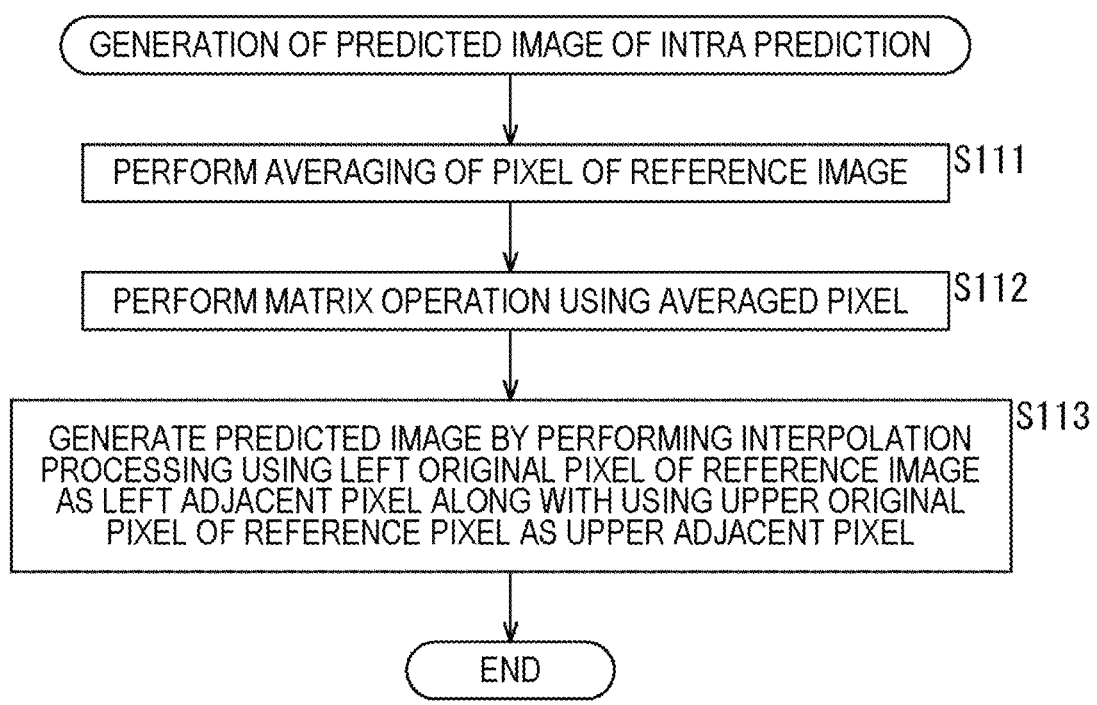
FIG. 8 is a flowchart illustrating an example of processing of generating a predicted image of the MIP performed by a predicted image generation unit 110.

FIG. 8 is a flowchart for describing an example of processing of generating the predicted image of the MIP performed by the predicted image generation unit 110.

In step S111, the averaging unit 111 averages the top original pixels of the reference image and averages the left original pixels of the reference image to generate the averaged pixel. The averaging unit 111 supplies the averaged pixel to the matrix-vector-multiplication unit 112, and the process proceeds from step S111 to step S112.

In step S112, the matrix-vector-multiplication unit 112 sets the matrix $A_k$ and the vector offset $b_k$ used for the matrix operation according to the prediction mode k. Furthermore, the matrix-vector-multiplication unit 112 uses the matrix $A_k$ and the offset $b_k$ to perform the matrix operation on the vector whose element is the averaged pixel from the averaging unit 111.

That is, the matrix-vector-multiplication unit 112 performs multiplication between the matrix $A_k$ and the vector having the averaged pixel of the averaging unit 111 as an element as the matrix operation. Furthermore, the matrix-vector-multiplication unit 112 adds the offset bk to the result of the multiplication as the matrix operation. The matrix-vector-multiplication unit 112 generates some pixels of the predicted image of the current prediction block by the above matrix operation and supplies the generated pixels to the interpolation unit 113, and the process proceeds from step S112 to step S113.

In step S113, the interpolation unit 113 uses the top original pixel of the reference image as the top adjacent pixel and the left original pixel of the reference image as the left adjacent pixel, and performs the interpolation processing using the top adjacent pixel, the left adjacent pixel, and some pixels of the predicted image of the current prediction block from the matrix-vector-multiplication unit 112.

The interpolation unit 113 generates the remaining pixels of the predicted image of the current prediction block by the interpolation processing, and generates the predicted image of the current prediction block by combining with some pixels of the predicted image from the matrix-vector-multiplication unit 112.

Figure 9:
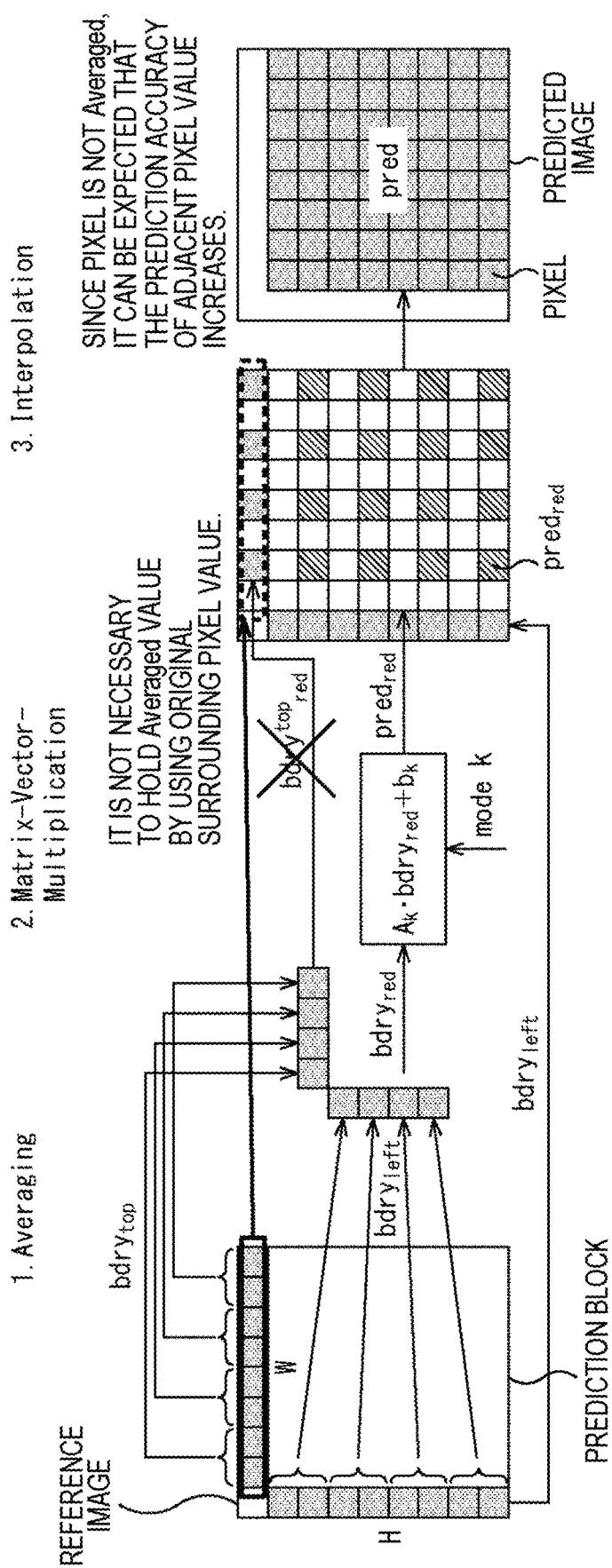
FIG. 9 is a diagram illustrating a method of generating a predicted image of MIP by the predicted image generation unit 110.

FIG. 9 is a diagram illustrating a method of generating a predicted image of MIP by a predicted image generation unit 110.

Similar to FIG. 1, in FIG. 9, a block of W×H=8×8 pixels is adopted as the current prediction block. However, the prediction block is not limited to the block of W×H=8×8 pixels.

Similar to JVET-N0217, the averaging unit 111 averages the top original pixel $bdry_{top}$ of the reference image for the current prediction block, and generates the plurality of averaged pixels $bdry_{red}$ as the down-sampled pixel.

Furthermore, similar to JVET-N0217, the averaging unit 111 averages the left original pixel $bdry_{left}$ of the reference image for the current prediction block, and generates the plurality of averaged pixels $bdry_{red}$ as the down-sampled pixel.

When the current prediction block is a block of W×H=8×8 pixels, the averaging of the top original pixel $bdry_{top}$ is performed by averaging the two top original pixels $bdry_{top}$ adjacent to each other in the lateral direction of the reference image, thereby generating four averaged pixels $bdry_{red}$. Similarly, the averaging of the left original pixel $bdry_{left}$ is performed by averaging the two left original pixels $bdry_{left}$ adjacent to the longitudinal direction of the reference image, thereby produces four averaged pixels $bdry_{red}$.

Here, in the present embodiment, the averaged pixel obtained by averaging the original pixels is adopted as the down-sampled pixel, but the down-sampled pixel is not limited to the averaged pixel. That is, the down-sampling can be performed by averaging the plurality of pixels, performing a calculation other than the average of the median or the like, or simply thinning out the pixels.

Similar to JVET-N0217, the matrix-vector-multiplication unit 112 uses the matrix $A_k$ and the offset bk set according to the prediction mode k of the intra prediction, and calculates expression $pred_{red}=A_k\ bdry_{red}+b_k$ as the matrix operation for vector $bdry_{red}$ with the averaged pixel $bdry_{red}$ as an element.

That is, the matrix-vector-multiplication unit 112 performs multiplication $A_k \cdot bdry_{red}$ between the matrix $A_k$ and the vector $bdry_{red}$ with the averaged pixel $bdry_{red}$ as an element as the matrix operation. Furthermore, the matrix-vector-multiplication unit 112 adds the offset $b_k$ to $A_k \cdot bdry_{red}$ as a result of multiplication. As a result, the matrix-vector-multiplication unit 112 generates some pixels $pred_{red}$ of the predicted image of the current prediction block.

Similar to JVET-N0217, the interpolation unit 113 performs the interpolation processing by using the top adjacent pixel adjacent to the top of the predicted image of the current prediction block, the left adjacent pixel adjacent to the left of the predicted image of the current prediction block, and some pixels pred$_{red}$ of the predicted image of the current prediction block generated by the matrix operation.

The interpolation unit 113 generates the remaining pixels (white pixels in the figure) of the predicted image by the interpolation processing, and generates the predicted image (pred) of the current prediction block by combining with the pixel pred$_{red}$ generated by the matrix operation.

However, in the interpolation processing of JVET-N0217, as described in FIG. 1, the averaged pixel bdry$^{top}_{red}$ generated by using the top original pixel bdry$_{top}$ among the averaged pixels bdry$_{red}$ of the reference image is used as the top adjacent pixel of the predicted image.

On the other hand, in the interpolation processing of the interpolation unit 113, the top original pixel bdry$_{top}$ itself of the reference image is used as the top adjacent pixel of the predicted image instead of the averaged pixel bdry$^{top}_{red}$.

As described above, since the predicted image generation unit 110 uses the top original pixel bdry$_{top}$ of the reference image as the top adjacent pixel, there is no need to hold (pixel value of) the averaged pixel bdry$^{top}_{red}$ required when using the averaged pixel as the top adjacent pixel. Furthermore, when the top original pixel bdry$_{top}$ of the reference image is used as the top adjacent pixel, it can be expected that the prediction accuracy of the intra prediction is improved as compared with the case where the averaged pixel bdry$^{top}_{red}$ is used.

<Another Configuration Example of Intra Prediction Unit 34>

Figure 10:
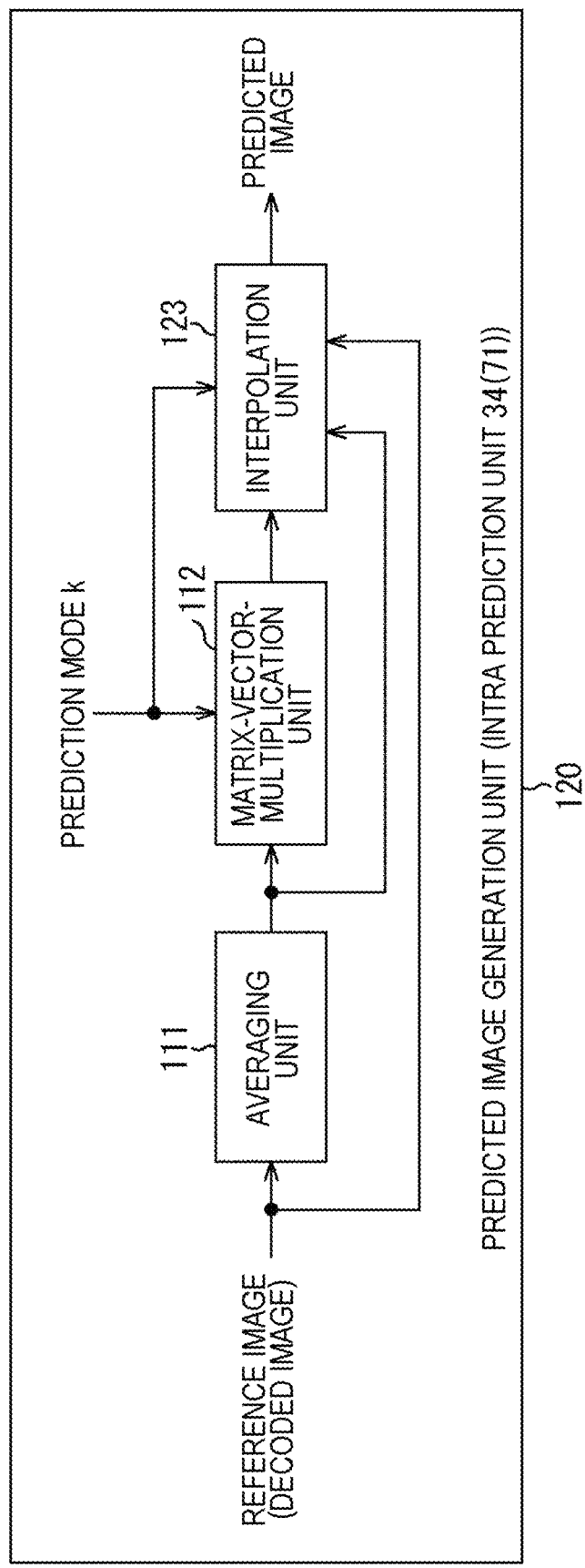
FIG. 10 is a block diagram illustrating another configuration example of the intra prediction unit 34.

FIG. 10 is a block diagram illustrating another configuration example of the intra prediction unit 34.

Note that similar to FIG. 7, FIG. 10 illustrates only the predicted image generation unit 120, which is a part that generates the predicted image of the MIP, in the intra prediction unit 34. The intra prediction unit 71 also has a predicted image generation unit similar to the predicted image generation unit 120.

Further, in the drawings, the parts corresponding to the predicted image generation unit 110 in FIG. 7 are designated by the same reference numerals, and the description thereof will be omitted as appropriate below.

The predicted image generation unit 120 includes an averaging unit 111, a matrix-vector-multiplication unit 112, and an interpolation unit 123.

Therefore, the predicted image generation unit 120 shares the predicted image generation unit 110 of FIG. 7 in that the predicted image generation unit 120 has the averaging unit 111 and the matrix-vector-multiplication unit 112. However, the predicted image generation unit 120 is different from the predicted image generation unit 110 in that the predicted image generation unit 120 has the interpolation unit 123 instead of the interpolation unit 113.

The predicted image generation unit 120 supplies the reference image and some pixels of the predicted image of the current prediction block generated by the matrix-vector-multiplication unit 112 to the interpolation unit 123, and supplies the prediction mode k and the averaged pixel generated by the averaging unit 111 thereto.

Similar to the interpolation unit 113, the interpolation unit 123 performs the interpolation processing by using the top adjacent pixels and the left adjacent pixels of the predicted image, and some pixels of the predicted image of the current prediction block from the matrix-vector-multiplication unit 112, and generates the predicted image by combing the remaining pixels of the predicted image generated by the interpolation processing with some pixels of the predicted image from the matrix-vector-multiplication unit 112.

However, the interpolation unit 123 can select whether to use the top original pixel of the reference image pixel as the top adjacent pixel or whether to use the averaged pixel as the down-sampled pixel, according to the prediction mode k. In addition, the interpolation unit 123 can select whether to use the left original pixel of the reference image pixel as the left adjacent pixel or whether to use the averaged pixel as the down-sampled pixel, according to the prediction mode k.

Figure 11:
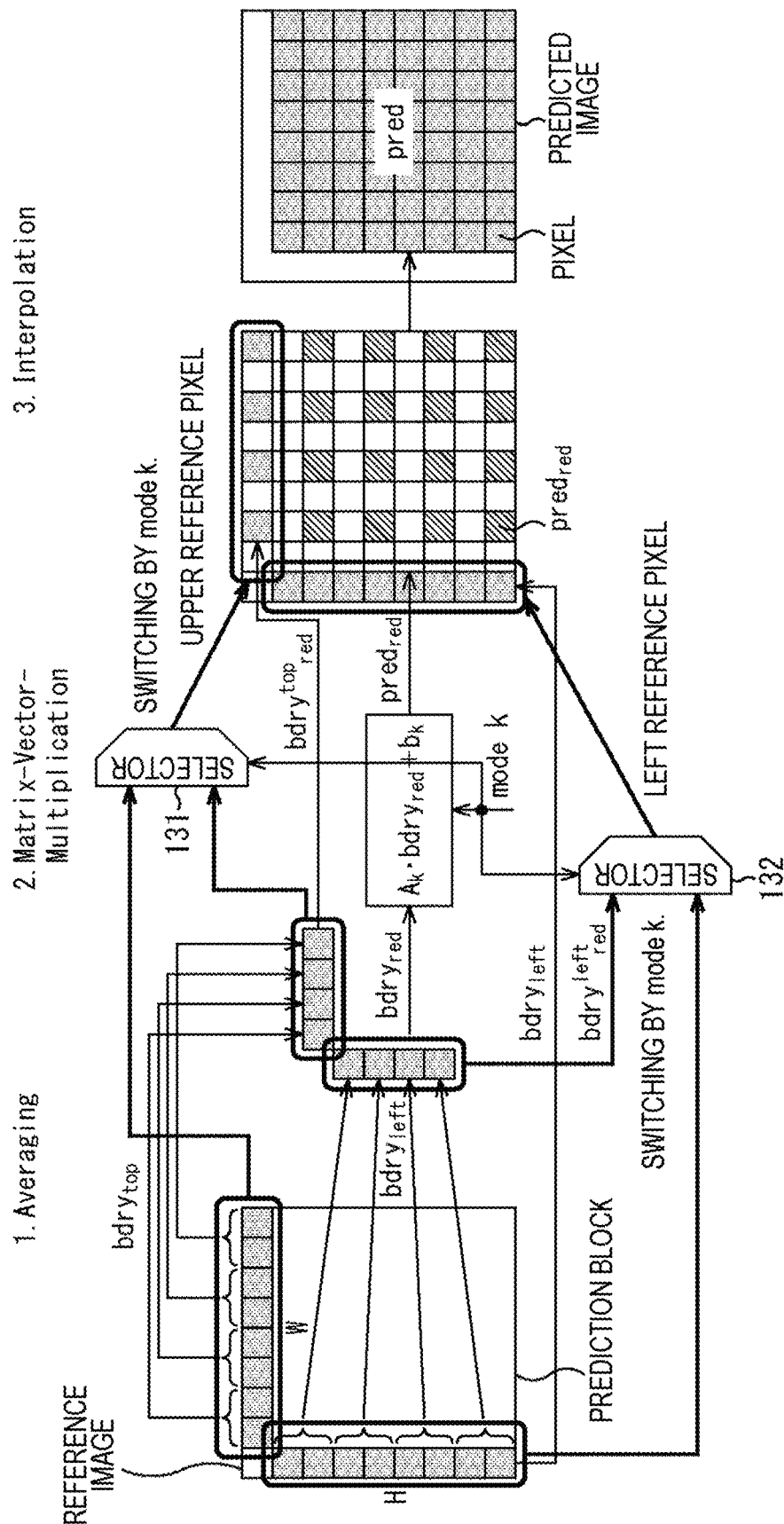
FIG. 11 is a diagram illustrating a method of generating a predicted image of MIP by a predicted image generation unit 120.

FIG. 11 is a diagram illustrating a method of generating a predicted image of MIP by a predicted image generation unit 120.

Similar to FIG. 9, in FIG. 11, a block of W×H=8×8 pixels is adopted as the current prediction block.

However, the prediction block is not limited to the block of W×H=8×8 pixels.

Similar to the predicted image generation unit 110, the predicted image generation unit 120 generates the averaged pixel bdry$_{red}$ by averaging the top original pixel bdry$_{top}$ of the reference image and the averaged pixel bdry$_{red}$ by averaging the left original pixel bdry$_{left}$ for the current prediction block in the averaging unit 111.

Further, similar to the predicted image generation unit 110, the predicted image generation unit 120 generates some pixels pred$_{red}$ of the predicted image of the current prediction block by calculating expression pred$_{red}$=A$_k$·bdry$_{red}$+b$_k$ as the matrix operation that targets the averaged pixel bdry$_{red}$ as an element in matrix-vector-multiplication unit 112.

Then, similarly to the predicted image generation unit 110, the predicted image generation unit 120 performs the interpolation processing using the top adjacent pixel adjacent to the top of the predicted image of the current prediction block, the left adjacent pixel adjacent to the left of the predicted image of the current prediction block, and some pixels pred$_{red}$ of the predicted image of the current prediction block generated by the matrix operation, thereby generating the predicted image (pred) of the current prediction block in the interpolation unit 123.

However, the interpolation unit 123 can select whether to use the top original pixel bdry$_{top}$ of the reference image pixel as the top adjacent pixel or whether to use the averaged pixel bdry$^{top}_{red}$ as the down-sampled pixel, according to the prediction mode k. In addition, the interpolation unit 123 can select whether to use the left original pixel of the reference image pixel bdry$_{left}$ as the left adjacent pixel or whether to use the averaged pixel bdry$^{left}_{red}$ as the down-sampled pixel, according to the prediction mode k.

The averaged pixel bdry$^{top}_{red}$ is an averaged pixel of the averaged pixel bdry$_{red}$ generated using the top original pixel bdry$_{top}$ (by averaging the top original pixel bdry$_{top}$). The averaged pixel bdry$^{left}_{red}$ is an averaged pixel generated using the left original pixel bdry$_{left}$.

The interpolation unit 123 has selectors 131 and 132.

The selector 131 is supplied with a top original pixel bdry$_{top}$ and an averaged pixel bdry$^{top}_{red}$. The selector 131 selects and outputs a top original pixel bdry$_{top}$ or an averaged pixel bdry$^{top}_{red}$ according to the prediction mode k. The interpolation unit 123 performs the interpolation processing using the pixel output by the selector 131 of the top original pixel bdry$_{top}$ and the averaged pixel bdry$^{top}_{red}$ as the top adjacent pixel.

The selector 132 is supplied with a left original pixel bdry$_{left}$ and an averaged pixel bdry$^{left}_{red}$. The selector 132 selects and outputs the left original pixel bdry$_{left}$ or the averaged pixel bdry$^{left}_{red}$ according to the prediction mode k. The interpolation unit 123 performs the interpolation processing using the pixel output by the selector 132 of the left original pixel bdry$_{left}$ and the averaged pixel bdry$^{left}_{red}$ as the left adjacent pixel.

As described above, when the predicted image generation unit 120 can select whether to use the top original pixel of the reference image as the top adjacent pixel or whether to use the averaged pixel, and/or select whether to use the left original pixel of the reference image as the left adjacent pixel or whether to use the averaged pixel, it can be expected that the prediction accuracy of the intra prediction is further improved.

FIG. 12 is a diagram illustrating an example of pixels selected as the top adjacent pixel and the left adjacent pixel according to the prediction mode k.

Here, the top adjacent pixel, the left adjacent pixel, or both the top adjacent pixel and the left adjacent pixel are also referred to as an adjacent pixel. Further, the top original pixel, the left original pixel, or both the top original pixel and the left original pixel are also referred to as an original pixel.

In FIG. 12, when the prediction mode k includes information indicating (the mode number of) the MIP mode and the size identifier MipSizeId, pixels selected as adjacent pixels (top adjacent pixel and left adjacent pixel) according to the MIP mode and the size identifier MipSizeId are illustrated.

In FIG. 12, "Original" represents original pixels (top original pixel and left original pixel), and "Averaged" represents an averaged pixel. As illustrated in FIG. 12, for example, when the MIP mode is 1 and the size identifier MipSizeId is 0, the left original pixel (Original) is selected as the left adjacent pixel, and the averaged pixel (Averaged) is selected as the top adjacent pixel.

The size identifier MipSizeId is an identifier representing the size of the matrix $A_k$ used in the MIP, and is set according to the block size of the current prediction block. Therefore, when the prediction mode k contains information representing the size identifier MipSizeId, it can be said that the prediction mode k includes information representing the block size of the current prediction block.

The prediction mode k can include information representing the prediction direction of intra prediction, the directional prediction, and the non-directional prediction (for example, player prediction or DC prediction). The prediction direction of the intra prediction includes the reference direction of the directional prediction.

When the prediction mode k includes the information representing the directional prediction, the original pixel or the averaged pixel can be selected as the adjacent pixel. For example, when the prediction mode k includes the information representing the directional prediction, the original pixel or the averaged pixel can be selected as the adjacent pixel according to the reference direction of the directional prediction.

Specifically, for example, when a pattern such as an edge of the longitudinal direction exists in the current prediction block and the reference direction of the directional prediction is close to the longitudinal direction, the top original pixel can be selected as the top adjacent pixel. Further, for example, when a pattern such as a horizontal edge exists in the current prediction block and the reference direction of the directional prediction is close to the lateral direction, the left original pixel can be selected as the left adjacent pixel. In this case, the prediction accuracy can be improved.

When the prediction mode k contains information representing the non-directional prediction, for example, when the DC prediction is performed as the intra prediction, the averaged pixel can be selected as the top adjacent pixel and the left adjacent pixel.

In addition, the selection of pixels to be adjacent pixels adjacent to the predicted image can be not only performed according to the prediction mode k, but can also be performed depending on whether the in-loop filter is applied to the decoded image (locally decoded image) as the reference image in the encoder 11, that is, whether the deblocking filter 31a, the adaptive offset filter 41, and a part or all of the ALF 42 have been applied. For example, it is possible to perform a simulation and select pixels as the adjacent pixels so that the cost is reduced depending on whether the in-loop filter is applied.

The intra prediction unit 34 can serve as the setting unit for setting the identification data for identifying whether to use the original pixel of the reference image as the adjacent pixel adjacent to the predicted image or whether to use the averaged pixel as the down-sampled pixel, in the generation of the predicted image of the intra prediction. The identification data set in the intra prediction unit 34 can be included in the encoded bitstream as part of the encoding information, for example.

The identification data can include data for identifying whether to use the top original pixel of the reference image as the top adjacent pixel or whether to use the averaged pixel as the down-sampled pixel. In addition, the identification data can include data for identifying whether to use the left original pixel of the reference image as the left adjacent pixel or whether to use the averaged pixel is used as the down-sampled pixel.

Note that Whether to use the original pixel of the reference image or the averaged pixel as the down-sampled pixel as the adjacent pixel is not selected according to the prediction mode or the like, the prediction mode or the like is treated as a separate prediction mode, and of the original pixel and the adjacent pixel, the one with the smaller cost can be selected.

<Description of Computer to Which the Present Technology is Applied>

Next, a series of processes of the encoder 11 and the decoder 51 described above can be performed by hardware or software. When a series of processes is performed by software, the programs constituting the software are installed on a general-purpose computer or the like.

FIG. 13 is a block diagram illustrating a configuration example of an embodiment of the computer on which the program for executing the above-described series of processes is installed.

The program can be recorded in advance on a hard disk 905 or a ROM 903 as a recording medium built in the computer.

Alternatively, the program can be stored (recorded) in a removable recording medium 911 driven by a drive 909. Such a removable recording medium 911 can be provided as so-called package software. Here, examples of the removable recording medium 911 include a flexible disc, a compact disc read only memory (CD-ROM), a magneto optical (MO) disc, a digital versatile disc (DVD), a magnetic disc, a semiconductor memory, and the like.

Note that the program can be not only installed on the computer from the removable recording medium 911 as described above, but can also be downloaded to the computer via a communication network or a broadcasting network and installed on the built-in hard disk 905. That is, for example, the program can be transmitted wirelessly from a download site to a computer via an artificial satellite for digital satellite broadcasting, or can be transmitted to a computer by wire via a network such as a local area network (LAN) or the Internet.

The computer has a built-in central processing unit (CPU) 902, and the input/output interface 910 is connected to the CPU 902 via the bus 901.

When a command is input by a user via the input/output interface 910 by operating the input unit 907 or the like, the CPU 902 executes the program stored in the read only memory (ROM) 903 accordingly. Alternatively, the CPU 902 loads the program stored in the hard disk 905 into a random access memory (RAM) 904 and executes the loaded program.

As a result, the CPU 902 performs processing according to the above-described flowchart or processing performed according to the configuration of the above-described block diagram. Then, the CPU 902 outputs the processing result from the output unit 906 from the communication unit 908, or transmits the processing result from the communication unit 908 via, for example, the input/output interface 910, as necessary, and furthermore records the processing result on the hard disk 905.

Note that the input unit 907 is constituted by a keyboard, a mouse, a microphone, and the like. In addition, the output unit 906 is constituted by a liquid crystal display (LCD), a speaker, or the like.

Here, in the present specification, the processing performed by the computer according to the program does not necessarily have to be performed in a time sequence according to the order described as the flowchart. That is, the processing performed by the computer according to the program also includes processing (for example, parallel processing or processing by an object) executed in parallel or individually.

Further, the program may be processed by one computer (processor) or may be distributed and processed by a plurality of computers. Furthermore, the program may be transmitted to a distant computer and executed.

Further, in the present specification, the system means a set of a plurality of components (devices, modules (parts), etc.), and it does not matter whether all the components are in the same housing. Therefore, any of a plurality of devices housed in separate housings and connected via a network and one device in which a plurality of modules is housed in one housing are systems.

Note that the embodiment of the present technology is not limited to the above-described embodiment, and various changes can be made without departing from the gist of the present technology.

For example, the present technology can be configured as cloud computing in which one function is shared by a plurality of devices via a network and processed jointly.

Further, each step described in the above-described flowchart can be executed by one device, and can also be shared and executed by a plurality of devices.

Furthermore, when one step includes a plurality of processes, the plurality of processes included in the one step can be executed by one device or shared and executed by a plurality of devices.

In addition, the effects described in the present specification are merely examples and are not limited, and other effects may be obtained.

REFERENCE SIGNS LIST

10 Image processing system
11 Encoder
21 A/D conversion unit
22 Rearrangement buffer 22
23 Calculation unit
24 Orthogonal transform unit
25 Quantization unit
26 Reversible encoding unit
27 Accumulation buffer
28 Inverse quantization unit
29 Inverse orthogonal transform unit
30 Calculation unit
31a, 31b Deblocking filter
32 Frame memory
33 Selection unit
34 Intra prediction unit
35 Motion prediction/compensation unit
36 Prediction image selection unit
37 Rate control unit
41 Adaptive offset filter
42 ALF
51 Decoder
61 Accumulation buffer
62 Reversible decoding unit
63 Inverse quantization unit
64 Inverse orthogonal transform unit
65 Calculation unit
67 Rearrangement buffer
68 D/A conversion unit
69 Frame memory
70 Selection unit
71 Intra prediction unit
72 Motion prediction/compensation unit
73 Selection unit
81 Adaptive offset filter
82 ALF
110 Predicted image generation unit
111 Averaging unit
112 Matrix-vector-multiplication unit
113 Interpolation unit
120 Predicted image generation unit
123 Interpolation unit
901 Bus
902 CPU
903 ROM
904 RAM
905 Hard disk
906 Output unit
907 Input unit
908 Communication unit
909 Drive
910 Input/output interface
911 Removable recording medium

The invention claimed is:

1. An image processing device, comprising:
circuitry configured to generate a predicted image of a current prediction block by performing interpolation processing using an original pixel of a reference image as a left adjacent pixel adjacent to a left of the predicted image of the current prediction block to be encoded, when performing intra prediction using a matrix operation;
the circuitry is configured to select whether to use the original pixel of the reference image or whether to use a down-sampled pixel as the left adjacent pixel adjacent to the left of the predicted image of the current prediction block, according to a prediction mode of the intra prediction in the interpolation processing, wherein the down-sampled pixel is a pixel obtained by averaging the original pixel; and an encoder configured to encode the current prediction block using the predicted image generated by the circuitry, wherein the circuitry selects whether to use the original pixel of the reference image or whether to use the down-sampled pixel as an adjacent pixel adjacent to the predicted image of the current prediction block when the prediction mode of the intra prediction includes information indicating directional prediction, and the circuitry uses the original pixel as the left adjacent pixel when a reference direction of the directional prediction is close to a lateral direction.

2. The image processing device according to claim 1, wherein
the prediction mode of the intra prediction includes information indicating a prediction direction of the intra prediction.

3. The image processing device according to claim 2, wherein
the prediction mode of the intra prediction includes information indicating a block size of the current prediction block.

4. The image processing device according to claim 1, wherein
the circuitry uses the down-sampled pixel of the reference image as the left adjacent pixel when the prediction mode of the intra prediction includes information indicating non-directional prediction.

5. The image processing device according to claim 1, wherein
the circuitry selects whether to use the original pixel of the reference image or whether to use the down-sampled pixel as the left adjacent pixel adjacent to the left of the predicted image of the current prediction block, depending on whether an in-loop filter is applied to the locally decoded image.

6. The image processing device according to claim 1, wherein the circuitry is configured to set identification data for identifying whether to use the original pixel of the reference image or whether to use the down-sampled pixel as the left adjacent pixel adjacent to the predicted image of the current prediction block.

7. The image processing device according to claim 6, wherein
the identification data is data for identifying whether to use the original pixel of the reference image or whether to use the down-sampled pixel as the left adjacent pixel.

8. An image processing method, comprising:
an intra prediction process of generating a predicted image of a current prediction block by performing interpolation processing using an original pixel of a reference image as a left adjacent pixel adjacent to a left of the predicted image of the current prediction block to be encoded when performing an intra prediction using a matrix operation;
selecting whether to use the original pixel of the reference image or whether to use a down-sampled pixel as the left adjacent pixel adjacent to the left of the predicted image of the current prediction block, according to a prediction mode of the intra prediction in the interpolation processing, wherein the down-sampled pixel is a pixel obtained by averaging the original pixel;

an encoding process of encoding the current prediction block using the predicted image generated in the intra prediction process; and selecting whether to use the original pixel of the reference image or whether to use the down-sampled pixel as an adjacent pixel adjacent to the predicted image of the current prediction block when the prediction mode of the intra prediction includes information indicating directional prediction, wherein the original pixel is used as the left adjacent pixel when a reference direction of the directional prediction is close to a lateral direction.

9. An image processing device, comprising:
circuitry configured to generate a predicted image of a current prediction block by performing interpolation processing using an original pixel of a reference image as a left adjacent pixel adjacent to a left of the predicted image of the current prediction block to be decoded when performing an intra prediction using a matrix operation;
the circuitry is configured to select whether to use the original pixel of the reference image or whether to use a down-sampled pixel as the left adjacent pixel adjacent to the left of the predicted image of the current prediction block, according to a prediction mode of the intra prediction in the interpolation processing, wherein the down-sampled pixel is a pixel obtained by averaging the original pixel; and
a decoder configured to decode the current prediction block using the predicted image generated by the circuitry, wherein
the circuitry selects whether to use the original pixel of the reference image or whether to use the down-sampled pixel as an adjacent pixel adjacent to the predicted image of the current prediction block when the prediction mode of the intra prediction includes information indicating directional prediction, and
the circuitry uses the original pixel as the left adjacent pixel when a reference direction of the directional prediction is close to a lateral direction.

10. An image processing method, comprising:
an intra prediction process of generating a predicted image of a current prediction block by performing interpolation processing using an original pixel of a reference image as a left adjacent pixel adjacent to a left of the predicted image of the current prediction block to be decoded, when performing intra prediction using a matrix operation;
selecting whether to use the original pixel of the reference image or whether to use a down-sampled pixel as the left adjacent pixel adjacent to the left of the predicted image of the current prediction block, according to a prediction mode of the intra prediction in the interpolation processing, wherein the down-sampled pixel is a pixel obtained by averaging the original pixel;
a decoding process of decoding the current prediction block using the predicted image generated in the intra prediction process; and
selecting whether to use the original pixel of the reference image or whether to use the down-sampled pixel as an adjacent pixel adjacent to the predicted image of the current prediction block when the prediction mode of the intra prediction includes information indicating directional prediction, wherein the original pixel is used as the left adjacent pixel when a reference direction of the directional prediction is close to a lateral direction.

\* \* \* \* \*